(12) United States Patent
Carding et al.

(10) Patent No.: US 12,527,852 B2
(45) Date of Patent: Jan. 20, 2026

(54) DELIVERY OF BACTERIA-DERIVED OUTER MEMBRANE VESICLES

(71) Applicant: Quadram Institute Bioscience, Norwich Norfolk (GB)

(72) Inventors: Simon Carding, Norwich Norfolk (GB); Regis Stentz, Norwich Norfolk (GB)

(73) Assignee: Quadram Institute Bioscience, Norwich Norfolk (GB)

( * ) Notice: Subject to any disclaimer, the term of this patent is extended or adjusted under 35 U.S.C. 154(b) by 695 days.

(21) Appl. No.: 17/595,330

(22) PCT Filed: May 15, 2020

(86) PCT No.: PCT/GB2020/051204
§ 371 (c)(1),
(2) Date: Nov. 15, 2021

(87) PCT Pub. No.: WO2020/229846
PCT Pub. Date: Nov. 19, 2020

(65) Prior Publication Data
US 2022/0175901 A1 Jun. 9, 2022

(30) Foreign Application Priority Data
May 15, 2019 (GB) .................... 1906830

(51) Int. Cl.
*A61K 39/02* (2006.01)
*A61K 39/00* (2006.01)
*A61K 39/39* (2006.01)

(52) U.S. Cl.
CPC .......... *A61K 39/0216* (2013.01); *A61K 39/39* (2013.01); *A61K 2039/55594* (2013.01)

(58) Field of Classification Search
None
See application file for complete search history.

(56) References Cited

U.S. PATENT DOCUMENTS

2016/0143940 A1   5/2016   Shen et al.

FOREIGN PATENT DOCUMENTS

WO   2017187190 A1   11/2017
WO   2020084295 A2   4/2020

OTHER PUBLICATIONS

Bentley et al (Access Microbiol., 1:1-2; published Apr. 8, 2019).*
Carvalho et al., "Use of bioengineered human commensal gut bacteria-derived microvesicles for mucosal plague vaccine delivery and immunization", Clinical and Experimental Immunology, vol. 196, pp. 287-304, 2019.
International Searching Authority in connection with PCT/GB2020/051204 filed May 15, 2020, "Written Opinion of the International Searching Authority", 18 pages, mailed Dec. 15, 2020.
Kim et al., "Bacterial outer membrane vesicles suppress tumor by interferon-γ-mediated antitumor response", Nature Communications, vol. 8, No. 626, pp. 1-9, 2017.
Tan et al., "Outer Membrane Vesicles: Current Status and Future Direction of These Novel Vaccine Adjuvants", Frontiers in Microbiology, vol. 9, Article 783, pp. 1-12, Apr. 2018.

* cited by examiner

*Primary Examiner* — Brian Gangle
(74) *Attorney, Agent, or Firm* — McKee, Voorhees & Sease, PLC

(57) ABSTRACT

Pharmaceutical compositions and preparation including outer membrane vesicles (OMVs) and at least one pharmaceutically acceptable carrier wherein said OMVs are native OMVs produced by the Gram-negative commensal bacteria *Bacteroides*.

Figure 1:
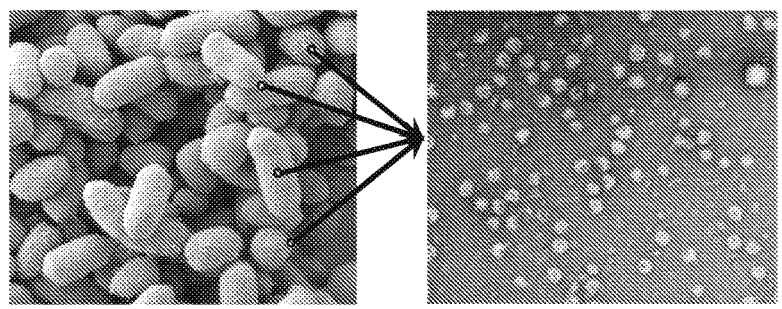
Figure 1:
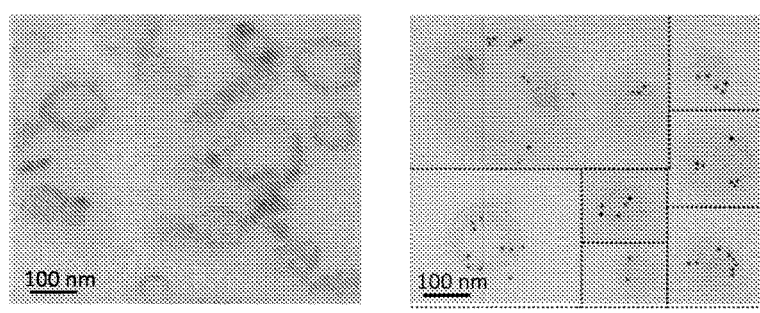
Figure 1:
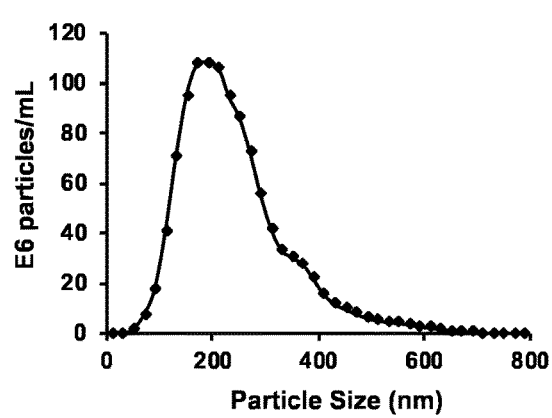
Figure 1:
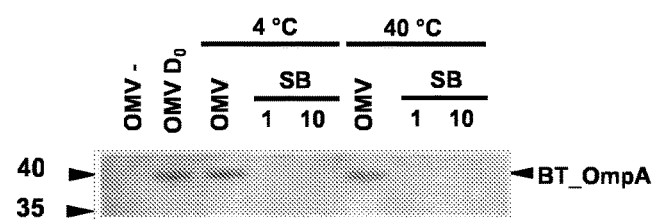

13 Claims, 15 Drawing Sheets
Specification includes a Sequence Listing.

A.

B.

C.

D.

Day 1

Day 5

*a*

*b*

Data summary

DELIVERY OF BACTERIA-DERIVED OUTER MEMBRANE VESICLES

CROSS REFERENCE TO RELATED APPLICATIONS

This is a U.S. National Phase application claiming priority to PCT/GB2020/051204, filed May 15, 2020, which claims priority to GB 1906830.3, filed May 15, 2019, the entire contents of which are hereby expressly incorporated by reference in their entirety including, without limitation, the specification, claims, and abstract, as well as any figures, tables, or drawings thereof.

REFERENCE TO SEQUENCE LISTING SUBMITTED ELECTRONICALLY

The instant application contains a Sequence Listing which has been submitted electronically and is herein incorporated by reference in its entirety. Said ASCII plain text copy, created on Nov. 15, 2024, is named "P13749US00_SequenceListing.txt" and is 3,057 bytes in size.

The invention to which this application relates is the provision of commensal bacteria-derived outer membrane vesicles (OMVs) in a pharmaceutical or pharmacological preparation. The OMVs are native and/or suitable for delivery of biologics, in particular delivery to the gastrointestinal and respiratory tract in mammals and humans.

The production of vesicles derived from the outer membrane of commensal bacteria using recombinant bacteria is disclosed in the applicant's co-pending application PCT/GB2017/051199 herein incorporated by reference.

Described over 50 years ago by Bishop and Work (1965) as 'extracellular glycolipids' produced by *Escherichia coli*, outer membrane vesicles (OMVs) are now considered to be naturally produced and secreted by most Gram-negative bacteria. Analyses of these 20-400 nm bilayered lipid membrane spherical structures have shown that they contain major components of the outer membrane such as lipopolysaccharide (LPS) in addition to the periplasmic contents of their 'parent' bacterium [1, 2].

Historically, OMVs have been associated with pathogenesis and the storage and transportation of virulence factors produced by enteric Gram-negative pathogens including *Helicobacter pylori* (VacA), *Shigella dysenteriae* (Shiga toxin) and enterohemorrhagic *Escherichia. coli* (ClyA) [3, 4, 5]. Recently, this paradigm for OMV function has been questioned due to new evidence demonstrating a non-pathogenic, mutualistic role for the OMVs produced by commensal gut bacteria. Members of the genus *Bacteroides* exclusively package carbohydrate and protein hydrolases in OMVs that perform a 'social function' by providing substrates for utilization by other bacteria and contributing to microbiota homeostasis [6, 7].

We [8, 9] and others have extended these observations providing evidence for a broader role of OMVs in gastrointestinal (GI)-tract homeostasis and the ability of *Bacteroides*-derived OMVs to influence host immune and epithelial cell responses. OMVs can contain adhesins, sulfatases and proteases which facilitate their interaction with host epithelial cells, allowing them to enter these cells through numerous routes, including micropinocytosis, lipid raft- and clathrin-dependent endocytosis [11, 12, 13]. *Bacteroides fragilis* OMVs containing polysaccharide A are detected by dendritic cells via Toll Like Receptor (TLR) 2 leading to enhanced T regulatory cell activity and production of anti-inflammatory cytokines (IL-10) that protect the host from experimental colitis [10]. We have demonstrated that OMVs produced by the human commensal bacterium *B. thetaiotaomicron* (Bt) can activate mammalian intestinal epithelial cell (IEC) intracellular $Ca^{2+}$-signalling [8]. This host cell $Ca^{2+}$ signalling response was dependent on Minpp, a novel constituent of these OMVs. Minpp is a homologue of a mammalian inositol phosphate polyphosphatase cell-signalling enzyme.

Collectively, these findings demonstrate a non-pathogenic and beneficial role for OMVs produced by commensal *Bacteroides* species and are consistent with the concept that packaging of bioactive macromolecules in OMVs enables members of the intestinal microbiota to influence host cell physiology and establish bacteria-host mutualism [13].

It is therefore an aim of the present invention to provide native OMVs from commensal bacteria to deliver biologics to the respiratory or gastrointestinal tract.

It is therefore a yet further aim of the present invention to produce an OMV therapeutic agent to protect the mammalian respiratory and GI-tract against infection, tumor growth, tissue inflammation and injury.

In a first aspect of the invention there is provided a pharmaceutical preparation including OMVs and at least one pharmaceutically acceptable carrier wherein said OMVs are native OMVs produced by the Gram-negative commensal bacteria *Bacteroides*.

In one embodiment the pharmaceutically acceptable carrier is phosphate-buffered saline (PBS).

Typically the pharmaceutical preparation is to prime, activate and/or boost immune responses to prevent infection, tissue inflammation, tumor growth and/or other injury.

Further typically said OMVs include and/or deliver biologically active peptides, proteins and/or biologics.

Preferably said pharmaceutical preparation and/or said OMVs are for delivery of said peptides, proteins or biologics to the gastrointestinal (GI) and/or respiratory tract. Typically the preparation is to prevent infection, tumour growth, tissue inflammation and/or injury to the gastrointestinal (GI) and/or respiratory tract and other organ systems.

Preferably the native OMVs are delivered to one or more mucosal sites to induce, activate or boost an immune response.

In one embodiment the pharmaceutical preparation includes at least one pharmaceutically active component. Typically the at least one pharmaceutically active component includes a vaccine agent such as antigens and/or pathogen components.

Typically the OMVs reduce the number of doses and/or amount of vaccine agent or component required to elicit a protective immune response. Further typically the OMV is an adjuvant.

In a second aspect of the invention there is provided an outer membrane vesicle (OMV) for use as an adjuvant.

In one embodiment the OMV adjuvant is delivered before a vaccine or one or more vaccine agents.

In alternative embodiments the OMV adjuvant may be delivered at substantially the same time or after the one or more vaccine agents.

Preferably the OMV is a native OMVs produced by the Gram-negative commensal bacteria *Bacteroides*.

Typically the peptide or protein is within or on the outer membrane of OMVs.

Species of *Bacteroides* include *B. acidifaciens, B. caccae, B. coprocola, B. coprosuis, B. eggerthii, B. finegoldii, B. fragilis, B. helcogenes, B. intestinalis, B. massiliensis, B. nordii, B. ovatus, B. stercoris, B. thetaiotaomicron, B. vulga-* tus, B. plebeius, B. uniformis, B. salyersai, B. pyogenes, B. goldsteinii, B. dorei and B. johnsonii and B. xylanisolvens. The related Parabacteroides genera includes P. distasonis and P. merdae, and strains thereof. Other species of Bacteroides are described, for example, in Clinical Microbiology Reviews, Vol. 20, no. 4, October 2007, p. 593-612 and Approved List of Bacterial Names from NCBI, www.bacterio.net and www.ncbi.nlm.gov.

Suitably a mannan-inducible expression system in accordance with the invention may be used in any Bacteroides.

Particularly preferred for the vaccine/pharmaceutical compositions in accordance with the present invention is B. thetaiotaomicron Bt) (VPI-5482), and strains thereof, including GH193, GH359 and GH364, for example.

In one embodiment the pharmaceutical preparation includes Salmonella typhimurium-derived vaccine antigens.

In one embodiment the OMV is an adjuvant of Salmonella typhimurium-derived vaccine antigens.

In one embodiment the pharmaceutical preparation includes influenza A virus (IAV) derived vaccine antigens.

In one embodiment the OMV is an adjuvant of influenza A virus (IAV) derived vaccine antigens.

Typically these antigens are in a form capable of eliciting antigen-specific immune and antibody responses in mucosal tissues and/or systemically.

In one embodiment, immunisation with OMVs containing the core stalk region of the IAV H5 hemagglutinin from an H5N1 strain induces heterotypic protection. In one embodiment the heterotypic protection includes an unrelated subtype H1N1 of IAV.

In one embodiment the heterologous peptide, protein or biologic includes the human therapeutic protein keratinocyte growth factor-2 (KGF-2). Typically the KGF-2 OMV reduces disease severity and promoted intestinal epithelial repair and recovery from colitis.

In a third aspect of the invention there is provided a composition including a native outer membrane vesicle (OMV) for use in a method for the treatment of typhoid wherein said OMV is produced by a native Gram-negative commensal bacteria.

In a preferred embodiment the native bacteria is *Bacteroides*. Preferably the native OMVs are from *Bacteroides thetaiotaomicron* (Bt).

In a further aspect of the invention there is provided a composition including an outer membrane vesicle (OMV) for use in a method for the treatment of influenza wherein said OMV is produced by the a native Gram-negative commensal bacteria.

In a preferred embodiment the native bacteria is *Bacteroides*. Preferably the native OMVs are from *Bacteroides thetaiotaomicron* (Bt).

In a further aspect of the invention there is provided a composition comprising an outer membrane vesicle (OMV) said OMV for use in a method for the treatment of colitis wherein said OMV is produced by a native Gram-negative commensal bacteria.

In a preferred embodiment the native bacteria is *Bacteroides*. Preferably the native OMVs are from *B. thetaiotaomicron* (Bt)

Typically the human therapeutic protein is a keratinocyte growth factor.

In one embodiment the native OMVs are delivered intranasally.

Typically Bt includes the Bt derivative strains below in Table 1.

TABLE 1

| Species | Strain | Plasmid | Protein expressed | Antibiotic selection* | Reference |
|---|---|---|---|---|---|
| *E. coli* | Rosetta 2(DE3) pLysS | pGH165 | St OmpA | Amp, Cm | This study |
| | Rosetta 2(DE3) pLysS | pGH201 | St SseB | Amp, Cm | This study |
| Bt | VPI-5482 | | | | DMSZ Colleciton |
| | GH290 | | | Tet | This study |
| | GH490 | pGH090 | | Ery | [57] |
| | GH484 | pGH182 | St OmpA | Ery | This study |
| | GH486 | pGH183 | St SseB | Ery | This study |
| | GH474 | pGH173 | Hu. KGF-2 | Ery | This study |
| | GH503 | pGH1840 | IAV H5F | Ery | This study |
| *S. Typhimurim* | SL1344 | | | | DMSZ collection |
| *L. lactis* | UKLc10 | | | | [22] |

*Amp = ampicillin;
Cm = chloramphenicol;
Tet = tetracycline;
Ery = erythromycin

In a further aspect of the invention there is provided native OMVs in a suitable pharmaceutical carrier, wherein administration of said OMVs provides anti-tumour properties.

Typically administration of OMVs reduces the size of established cancers or tumours. Further typically the tumours are breast cancer tumours.

In one embodiment the OMV anti-tumour effect is dependent on dose. Typically the optimal dose range is between substantially $10^7$ and $10^9$. Further typically substantially below or above this range, OMVs are ineffective.

In one embodiment the native OMVs are *Bacteroides* OMVs

In a further aspect of the invention there is provided a method for producing OMVs, said method including the step of growing a bacterial cells and filtering the same. Typically the method further includes any one or any combination of; centrifugation, filter sterilisation, ultrafiltration and/or size exclusion chromatography.

Materials and Methods

OMV Preparation

OMVs were isolated following a method adapted from Stentz et al., [Stentz et al. 2015]. Cultures of Bt (500 mL) were grown under anaerobic conditions at 37° C. in an anaerobic cabinet. Bacterial starter-cultures were grown overnight in 20 ml 'Brain Heart Infusion' (BHI) medium (Oxoid) supplemented with 15 μM haemin (Sigma-Aldrich) (BHIH). 0.5 ml of the starter-culture was used to inoculate 500 ml BHI supplemented with 0.75 μM haemin. Cells were harvested after 16 h at an approximate OD600 nm of 4.0, which corresponds to early stationary phase. The cells were centrifuged at 5500 g for 45 min at 4° C. and the supernatants filtered through polyethersulfone (PES) membranes (0.22 μm pore-size) (Sartorius) to remove debris and cells. Supernatants were concentrated by ultrafiltration (100 kDa molecular weight cut-off, Vivaspin 50R, Sartorius), the retentate was rinsed once with 500 mL of PBS (pH 7.4) and concentrated to 0.5 mL. Further purification was performed by fractionation of the OMV suspension by size-exclusion chromatography using a cross-linked agarose gel filtration base matrix, such as CL2-B Sepharose (Sigma-Aldrich) column (120 cm×1 cm) in PBS buffer. The absorbance of the fractions was measured at 280 nm and the first fractions displaying an absorbance peak were pooled and concentrated down to 1 ml with a Vivaspin 20 centrifugal concentrator (100 kDa molecular weight cut-off, Sartorius) and filtered through a 0.22 μm PES membrane (Sartorius). The vesicle concentration of the purified OMV suspension was determined by Nanoparticle Tracking Analysis (NTA).

Nanoparticle Analysis

Size distribution of vesicles was performed on 1 ml of OMV suspensions diluted 100 times with PBS. Videos were generated using a Nanosight nanoparticle instrument (NanoSight Ltd) to count the number of OMVs in each sample. A 1-min AVI file was recorded and analysed using NTA (Version 2.3 Build 0011 RC, Nanosight) software to calculate size distributions and vesicle concentrations using the following settings: calibration: 166 nm/pixel; blur: auto; detection threshold: 10, minimum track length: auto, temperature: 21.9 C, viscosity: 0.96 cP. The accuracy of the measurement was confirmed using 100 nm silver nanoparticles (Sigma-Aldrich).

Healthy Donors and Patients

Human peripheral blood was collected from healthy volunteers with no known autoimmune or inflammatory diseases, allergies, or malignancies, following informed consent (reference numbers 08.H0717.24 and RD17/095). Crohn's disease patients were seen in the Outpatients Clinic at St Marks Hospital, London North West University Healthcare NHS Trust and blood was taken following informed consent (reference number 08.H0717.24).

Bacterial Stimulation of Blood DC

Peripheral blood mononuclear cells (PBMCs) were isolated by centrifugation over Ficoll-Paque Plus (Amersham Biosciences, Chalfont St. Giles, UK). PBMC were resuspended in Dutch modified RPMI 1640 (Sigma-Aldrich, Dorset, UK) containing 100 U/mL penicillin/streptomycin, 2 mM L-glutamine, 50 μg/mL gentamicin (Sigma-Aldrich) and 10% fetal calf serum (TCS cell works, Buckingham, UK) and $5\times10^5$ cells per condition were plated in 96-well U-bottom plates. PBMC were incubated with either $2\times10^5$ heat-killed BtVPI-5482 (T) or outer membrane vesicles (OMV) at 10-fold incremental concentrations from $10^{10}$ to 10 vesicles/ml at 37° C., 5% $CO_2$ for 20 hr.

ELISA

PBMC were cultured with bacteria and OMV as described above and cell supernatants were taken at 20 hr poststimulation and stored at −80° C. Amounts of cytokines (IL-6 and IL-10) were assessed using Human DuoSet ELISA kits (R and D systems) according to the manufacturer's instructions. Plate was read on the Tecan Infinite F50 plate reader and data was analysed using the Magellan software.

Results

To test whether the outer membrane vesicles (OMV) isolated from *B. thetaiotaomicron* elicit an immune response, we cultured whole peripheral blood mononuclear cells (PBMC) from healthy donors with descending concentrations of OMV purified by size-exclusion for 20 h. As a positive control, we also cultured PBMC with heat-killed Bt.

We examined amounts of IL-6 and IL-10 in total supernatants of the PBMC following 20 h culture with Bt or OMV, we also saw significant amounts of IL-6 and measurable amounts of IL-10, although data did not reach significance (FIGS. 9A and B). We were also interested to see whether the response of DC to Bt or OMV was altered in disease so we obtained PBMC from patients with Crohn's disease (n=3). While production of IL-6 by mDC is similar to HC, there is a trend towards decreased IL-10 by mDC although this did not reach significance (FIGS. 9C and D).

Specific embodiment of the invention are now described with reference to the figures, wherein:

FIG. 1: Appearance, size, structure and stability of Bt OMVs. (a) Electron microscopy (EM) of Bt cells showing vesicles budding from their surface before release into the milieu (lines in left panel), and EM image of OMVs extracted from cell culture supernatants (right panel). (b) Immunodetection of naïve Bt OMVs using colloidal gold anti-rabbit Ig to detect binding of rabbit anti-Bt OmpA antisera (right panel). Left panel shows absence of staining of OMVs produced by an OmpA deletion mutant of Bt. (c) Size distribution of OMVs produced by Bt determined by nanoparticle tracking analysis. (d) Thermostability of OMVs at day 0 (OMV $D_0$) and after storage of OMV suspensions at 4° C. or 40° C. for 30 days as measured using immunoblotting to detect OmpA in extracts of naïve OMVs (OMV) or OMVs of ompA deletion mutants (OMV−), and of neat (1) or ten-times concentrated (10) OMV storage buffer (SB) (PBS was the storage buffer).

Figure 2:
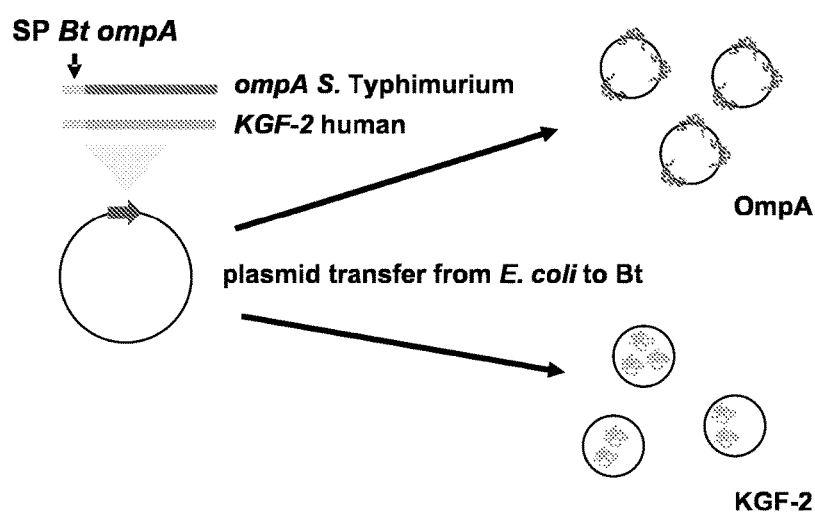
Figure 2:
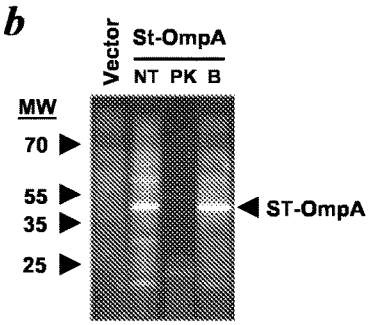
Figure 2:
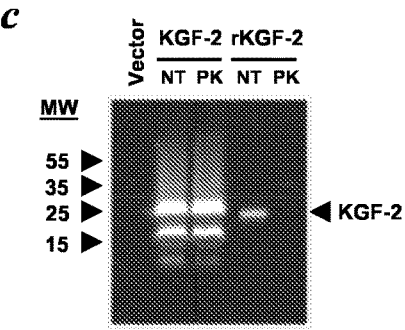
Figure 2:
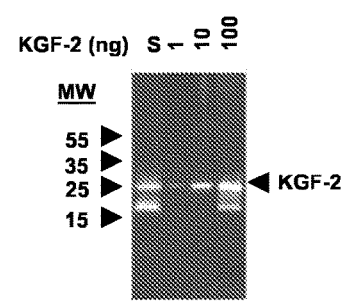

FIG. 2: Expression of heterologous proteins in Bt OMVs. (a) Schematic of cloning procedure for the export of proteins of interest into the lumen or at the surface membrane of OMVs. The secretion peptide of Bt OmpA (SP BtompA) is indicated in yellow and fused at the N-terminus of the gene of interest. (b and c) Determination of protein location after treatment with proteinase K (PK). Immunoblotting of StOmpA (b) and KGF-2 (c) with and without pre-treatment of OMV suspensions with proteinase K. NT: not treated; PK: +Proteinase K; B: PK buffer alone. (d) KGF-2 quantification within OMVs. Comparison of recombinant KGF-2 (1-100 ng) with 10 μl of 1 ml OMV suspension(S).

Figure 3:
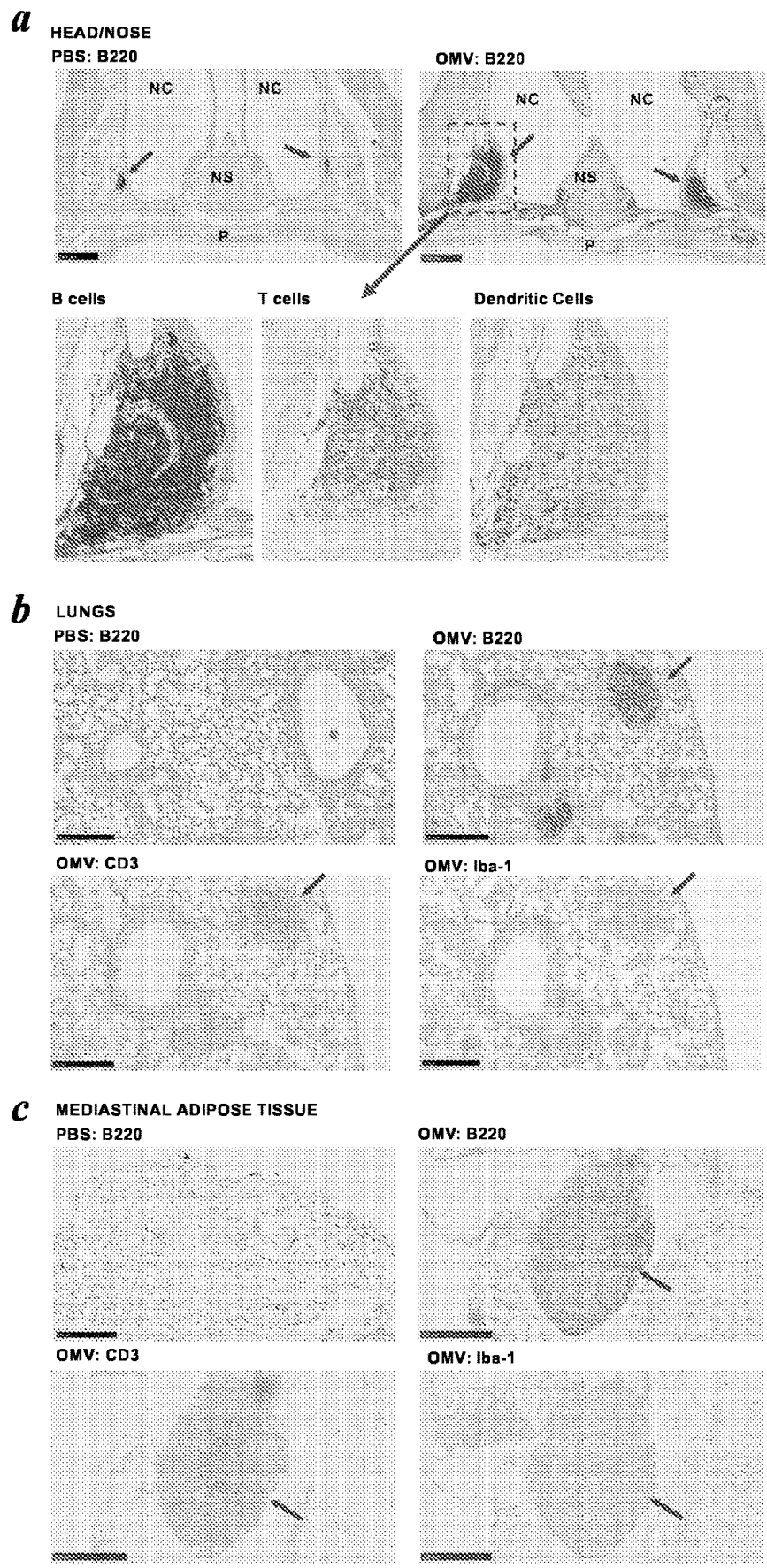

FIG. 3: Intrinsic adjuvanticity of Bt OMVs. (a) Mice (n=5) were intranasally adminstered PBS alone native Bt OMVs (OMV) in PBS and 5 days later heads and thoracic tissue was processed for immunohistology to visualise immune cell activation and formation of organised lymphoid tissue containing $CD45R^+$ B cells (B220), $CD3^+$ T cells (CD3) and macrophages/dendritic cells (Iba-1) in the nasal associated lymphoid tissue (a) the lung parenchyma (b) and mediastinal adipose tissues (c). Red arrows define nasalassociated lympoid tissue (NALT), bronchus-associated lymphoid tissue (BALT) and fat-associated lymphoid tissue (FALC) in a, b and c respectively. NC: nasal cavity, NS: nasal septum, P: hard palate.

Figure 4:
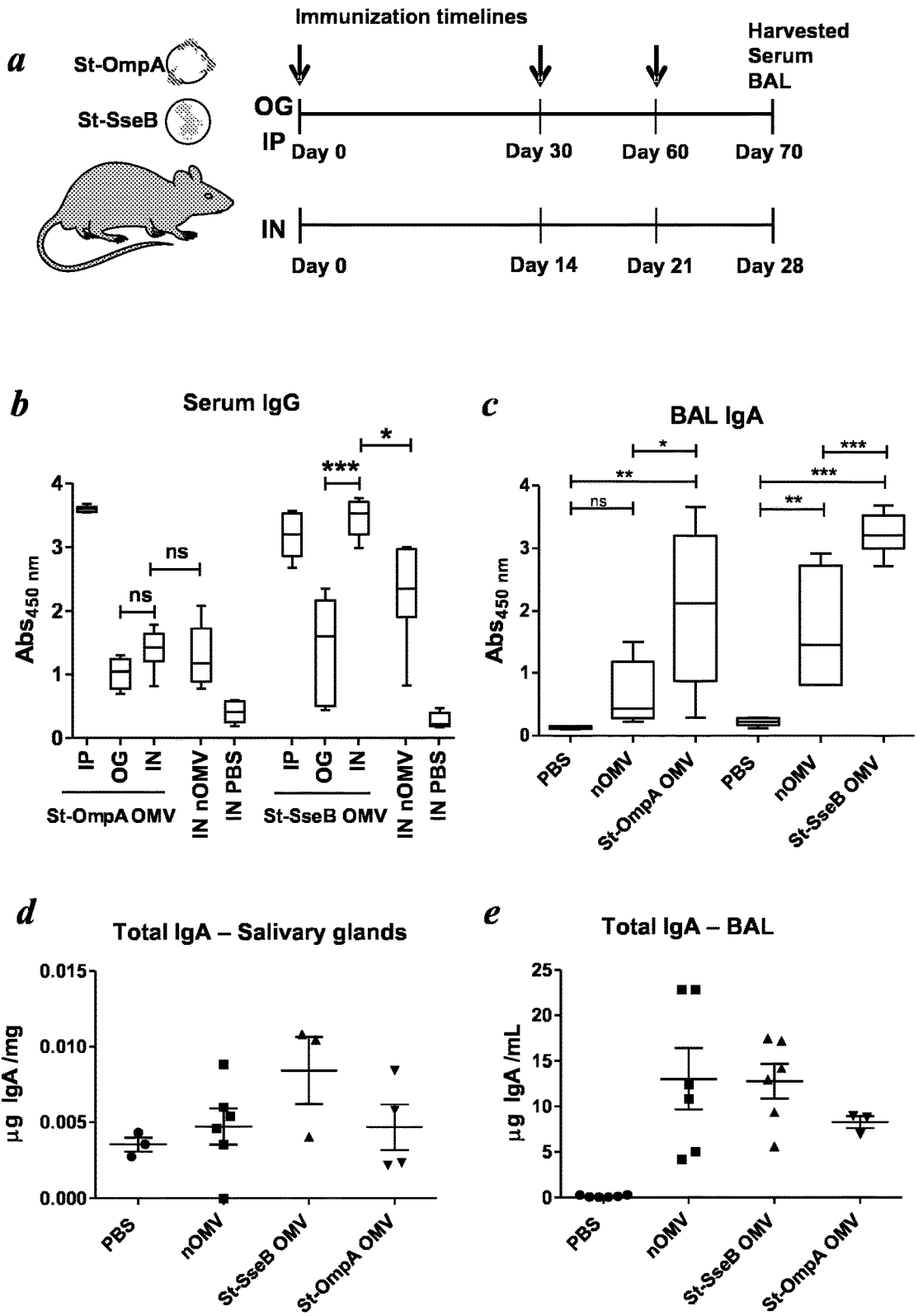

FIG. 4: Bt OMV-elicited systemic and mucosal antibody responses. (a) Mice (n=5-6/grp) were administered Bt OMVs expressing the *Salmonella* OmpA or SseB proteins via the oral (OG), intranasal (IN) or intraperitoneal (IP) routes according to the dosing regimen described in the Material and Methods section. Arrows indicate time of immunization. Naïve OMVs (nOMV) and PBS were administrated to mice (n=5-6/grp) as control groups. At autopsy, serum (b) and bronchoalveolar lavage fluid (BAL) (c) were analysed for anti-OmpA and anti-SseB IgG and IgA antibody titres, respectively, by ELISA. The boxplots identify the mean and upper and lower quartile values for data sets obtained from animals within each treatment group. Analysis of variance for multiple comparisons of means between independent samples (ANOVA) was followed by a Tukey's test. *$P<0.05$; $P<0.01$; *$P<0.001$; ns, not significant. Total IgA levels were also determined in salivary gland tissue homogenates (d) and in BAL (e) samples from each group of animals by ELISA using IgA standards as described in the Materials and Methods section.

Figure 5:
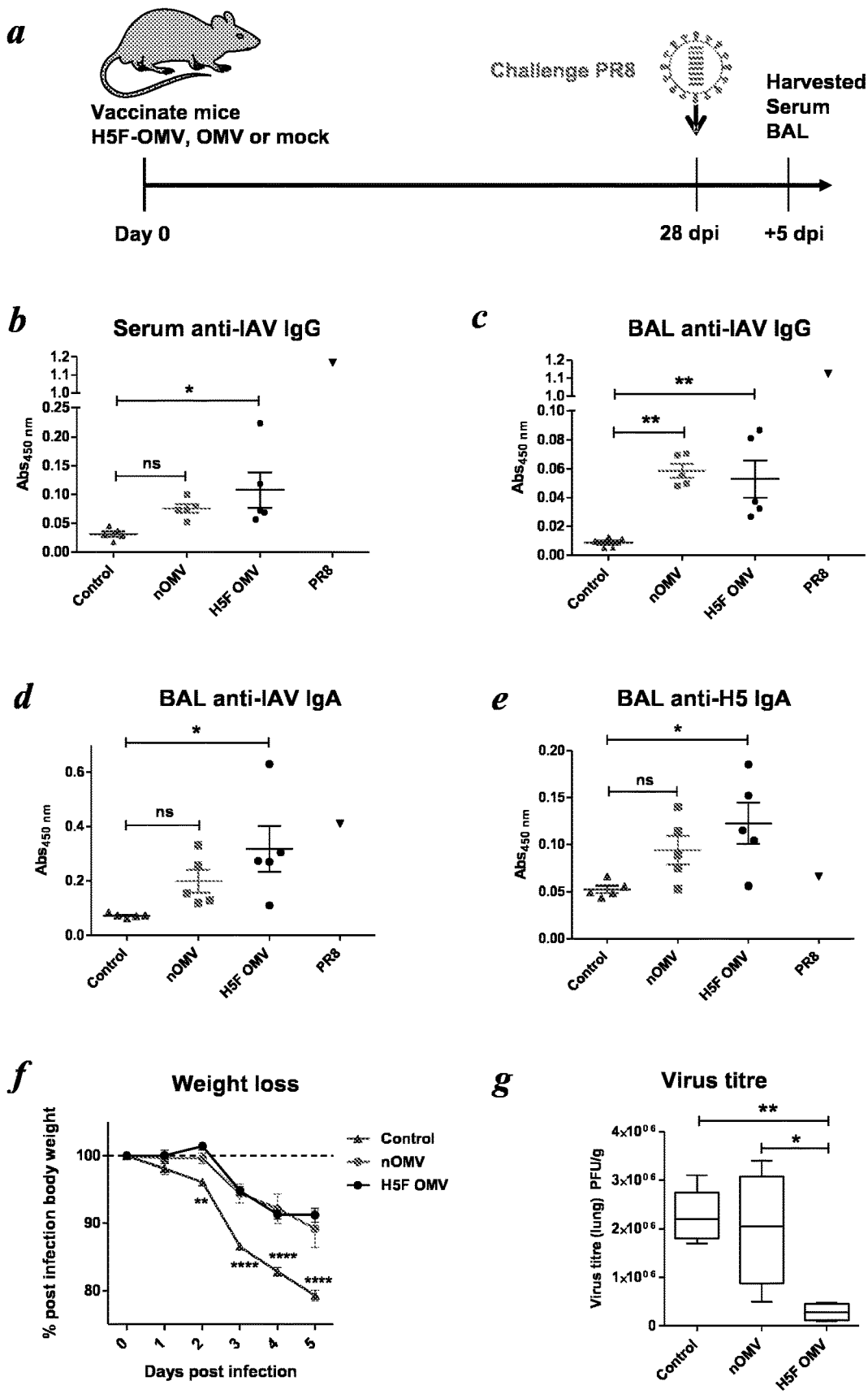

FIG. 5: Bt OMVs expressing IAV H5F protein confer a level of protection to virus infection in mice. (a) Mice were immunised intranasally with H5F-OMVs in PBS; controls were administered intranasally with naïve OMVs or PBS alone (mock) at the indicated time-points; after 28 days all were challenged intranasally with a 10-fold lethal dose of IAV strain A/PR/8/34 (PR8, H1N1). At necropsy serum (b) and bronchoalveolar lavage fluid (BAL) (c, d) were analysed for IAV IgG and IgA antibodies by ELISA using UV-inactivated PR8 virus. BAL samples were also analysed for H5 HA specific IgA antibodies (e) using recombinant H5 HA as the target antigen. Immune serum and BAL from PR8 IAV-infected mice (PR8) were used as reference samples. (f) The weight of individual animals in each group was assessed daily. (g) Lung homogenates were assessed for viral load (PFU/g lung tissue) at necropsy. Statistical analysis was performed using one-way ANOVA with Tukey's multiple comparison tests (panels b, c, d, e, g) or two-way ANOVA with Bonferroni post-tests. ns, not significant; *P<0.05; P<0.01; *P<0.001.

Figure 6:
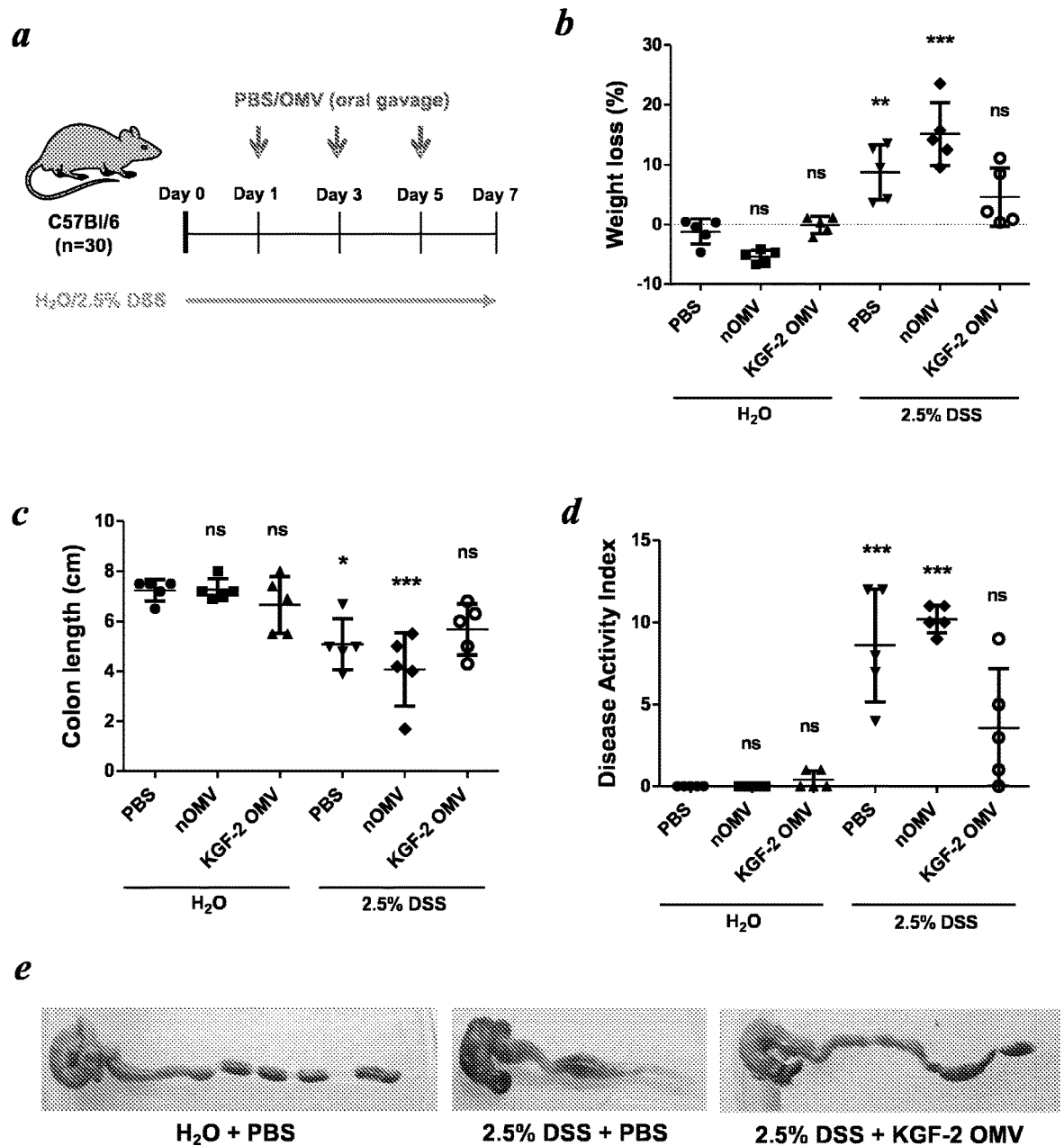

FIG. 6: OMVs containing KGF-2 ameliorate DSS-induced colitis in mice. (a) Groups of mice were provided with drinking water with or without 2.5% (w/v) DSS for 7 days. On days 1, 3 and 5 mice were orally gavaged with either PBS, naïve OMVs or OMVs containing KGF-2. (b) Percent weight loss at day 7. (c) Colon length at day 7. (d) Disease Activity Index (DAI) at day 7. (e) Representative images of colons. Data expressed as mean±SD (n=5). Statistical analysis was performed using one-way ANOVA with Tukey's multiple comparison tests. Mice gavaged with PBS and receiving regular drinking water were considered as the reference group for statistical analysis. ns, not significant; *P<0.05; P<0.01; *P<0.001.

Figure 7:
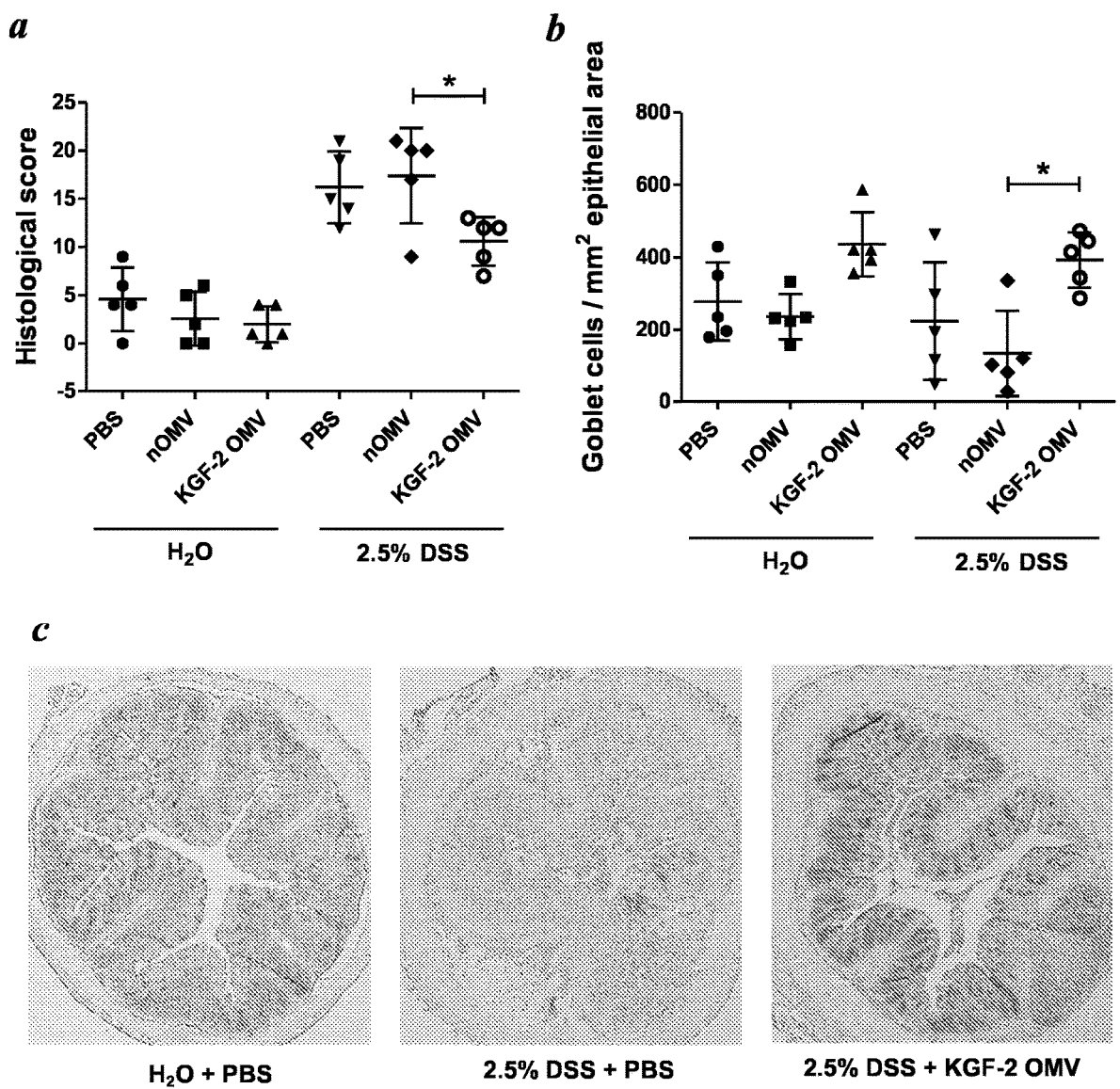

FIG. 7: OMVs containing KGF-2 protect and restore goblet cells in mice with DSS-induced colitis. (a) Histological score of colon tissue as determined by microscopy of H&E stained sections obtained at necropsy. (b) Number of Alcian Blue stained goblet cells per $mm^2$ of epithelial area. (c) Microscope images of goblet cell distribution in representative colon sections stained with Alcian Blue. Data expressed as mean±SD (n=5). Statistical analysis was performed using one-way ANOVA with Tukey's multiple comparison tests. *P<0.05.

Figure 8:
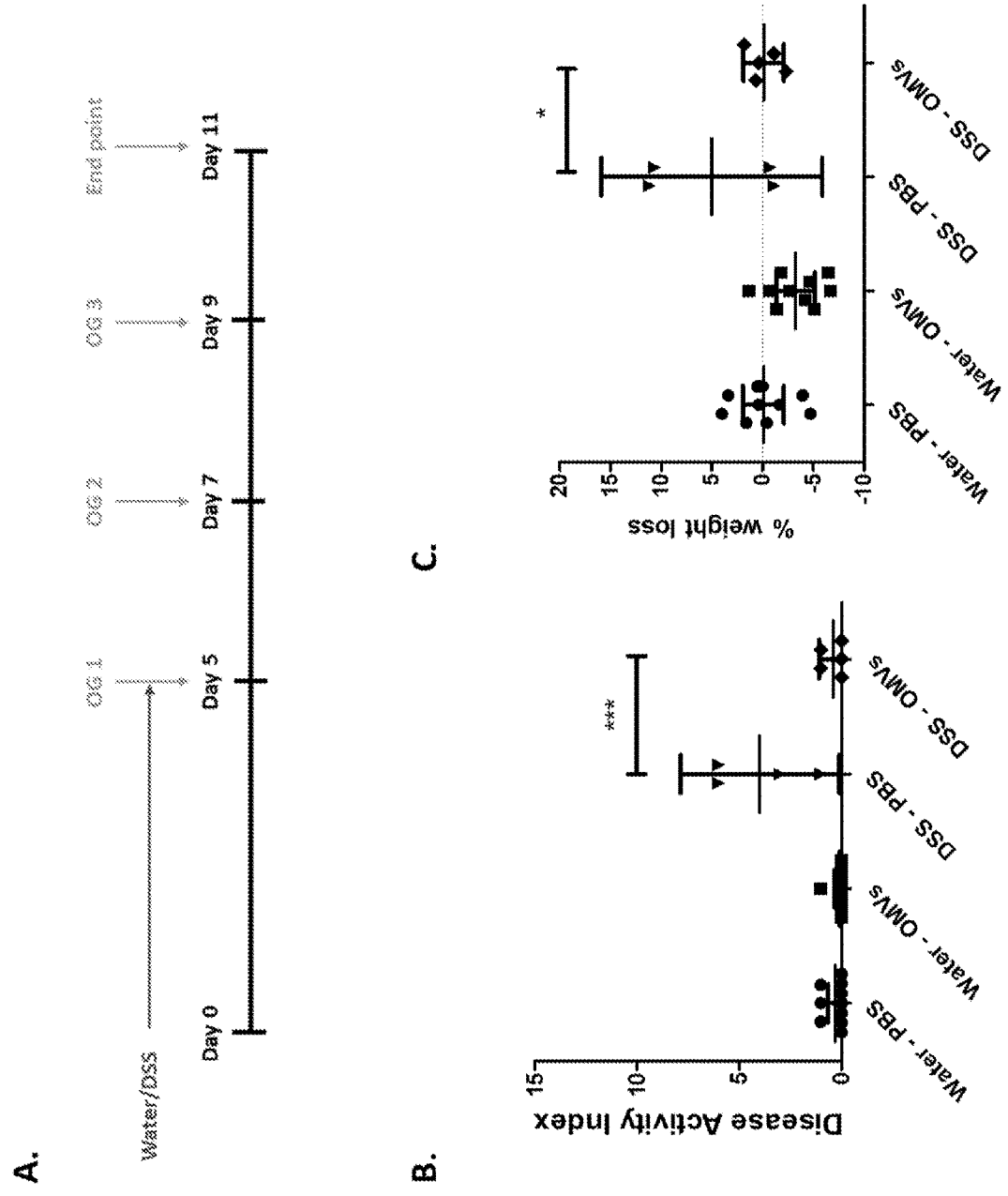

FIG. 8. Treatment of DSS-induced colitis with Bt OMVs. A. Groups of mice were provided drinking water with or without 2.25% (w/v) DSS for 5 days. On days 5, 7 and 9 mice were orally gavaged (OG) with either PBS or native OMVs B. Disease Activity Index (DAI) at day 11. C. Percentage weight loss at day 11. ***P<0.001; *P=0.017. OG.

Figure 9:
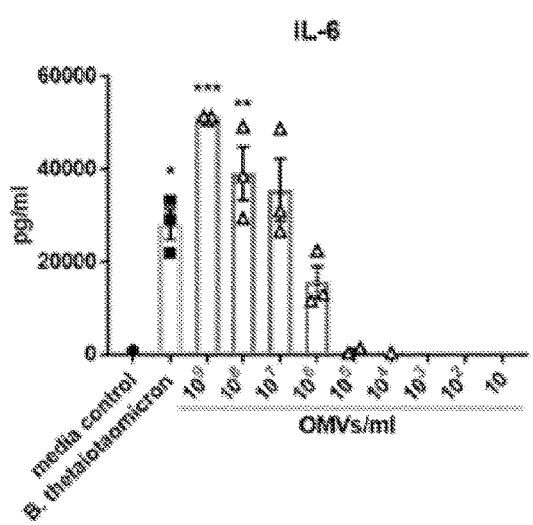
Figure 9:
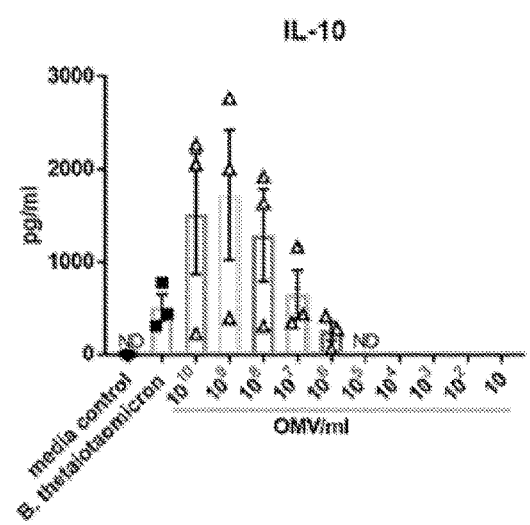
Figure 9:
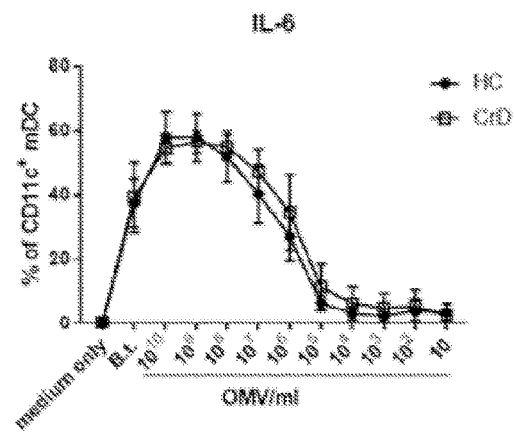
Figure 9:
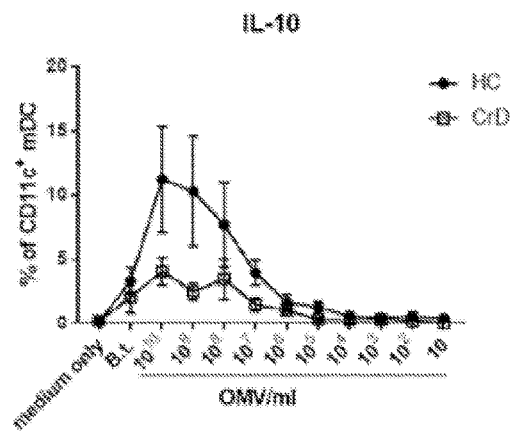

FIG. 9. Stimulation of dendritic cells by OMVs. To test whether the outer membrane vesicles (OMV) isolated from Bt elicit an immune response, whole peripheral blood mononuclear cells (PBMC) from healthy donors were stimulated for 20 h with descending concentrations of OMV purified by size-exclusion (FIGS. 9A and B). As a positive control, PBMC were exposed to heat-killed Bt. The amounts of IL-6 and IL-10 in total supernatants of the PBMCs were measured (FIGS. 9A and B). The response of DCs to Bt or OMV was also measured with PBMC from patients with Crohn's disease (n=3) (FIGS. 9C and D).

Supplementary Data

Figure 10:
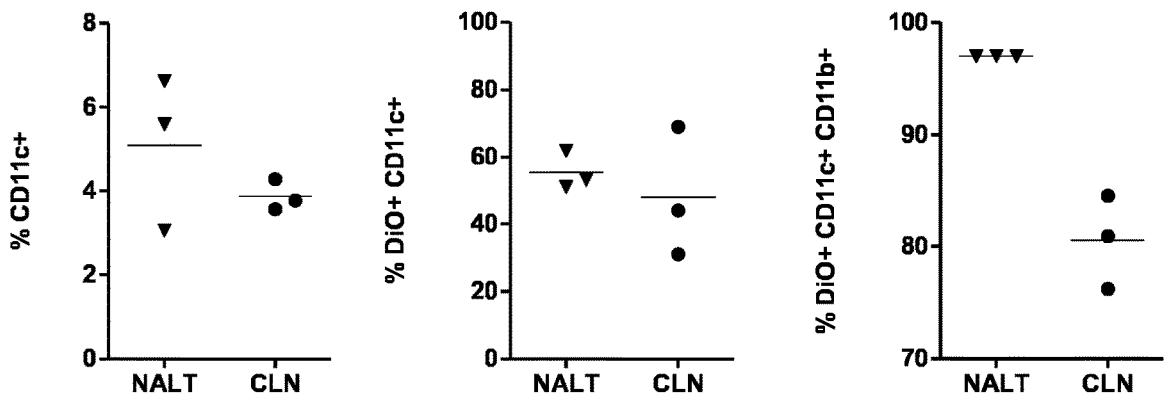
Figure 10:
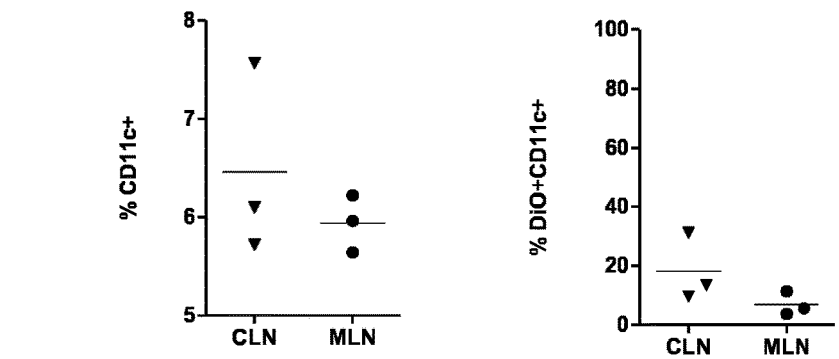
Figure 10:
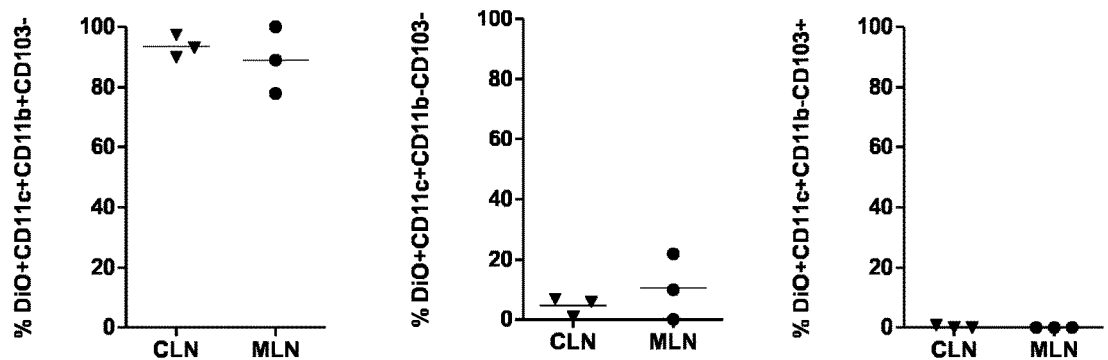

FIG. 10: Acquisition of fluorescent labelled Bt OMVs by dendritic cells and subsequent trafficking to lymph nodes after intranasal administration. OMVs were fluorescently-labelled with DiO and administered intranasally to mice. At d1 and d5 post-inoculation mice were sacrificed. Cells from nasal-associated lymphoid tissue (NALT), cervical lymph nodes (CLN) and mediastinal lymph nodes (MLN) were separated and analysed by FACS using antibodies to dendritic cells (CD11c) and antibodies to define dendritic cell subsets (CD11b and CD103). (a) Representative gating strategy showing from left to right gating out debris, for single cells, for total dendritic cells (DC, CD11c$^+$), for the subset of DC that have taken up OMV (DiO$^+$, CD11c$^+$) and the for the subsets of OMV$^+$ DC that express either CD11b or CD103. (b) Day 1 post-administration. Graphs show the percentage of cells in NALT and CLN that are DCs, and the percentage of DC that are labelled or labelled and CD11b$^+$. (c) Day 5 post-administration. Graphs show the percentage of cells in CLN and MLN that are DCs, and the percentage of DC that are labelled or labelled and CD11b$^+$ or CD103$^+$.

Figure 11:
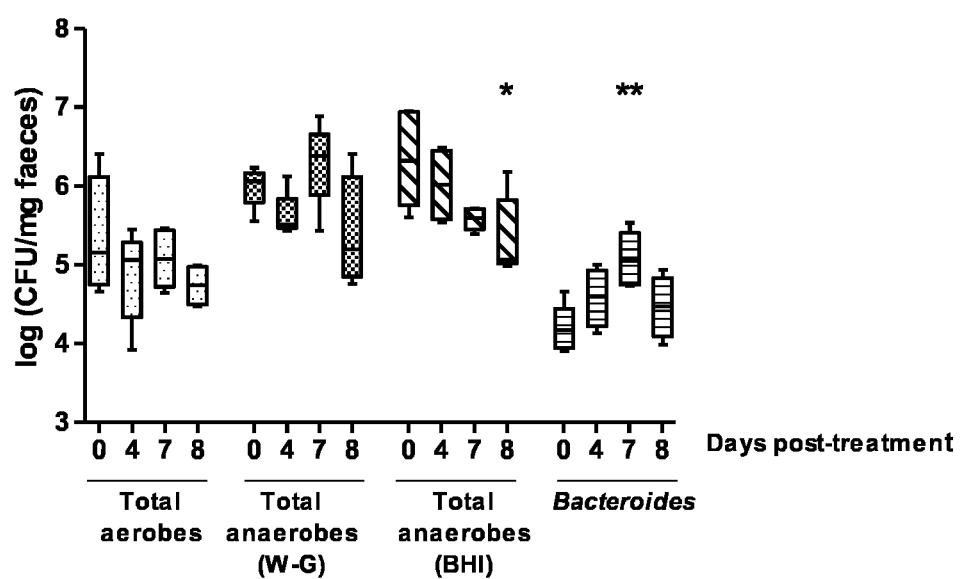

FIG. 11: The impact of orally administered Bt OMVs on the recipients' intestinal microbiota. Mice (n=5) were orally gavaged with native OMVs on day 3, 5 and 7, and faeces was collected on day 0, 4, 7 and 8 to evaluate the impact of OMVs on the host microbiota. Faeces were weighed, homogenized in PBS and serially diluted prior to plating on different agar media to select for: Total aerobes (on nutrient media); Total anaerobes (on Wilkins-Chalgren [W-G] or Brain Heart Infusion [BHI] media); or *Bacteroides* spp. (on BHI media supplemented with gentamicin and amikacin). The results are expressed in the logarithm of the CFU normalized to the weight of individual faecal samples for each day and growth medium. Data are expressed as means±SD. Statistically significant differences were evaluated using a Dunnett bilateral post-hoc test to compare days after OMV administration vs. the control day 0. *P<0.05; **P<0.01.

Figure 12:
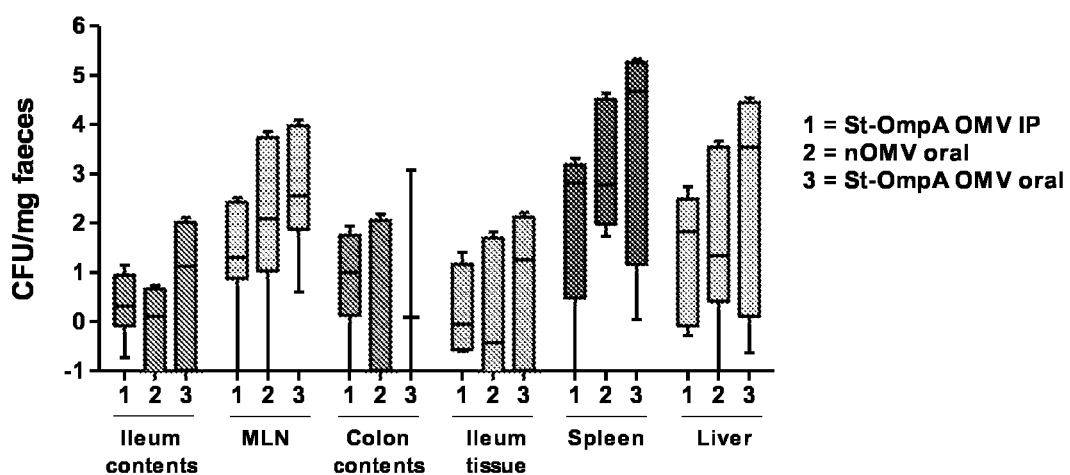

FIG. 12: Colonization of OMV-StOmpA immunised mice after *Salmonella* challenge. Mice (n=5-6/grp) immunised with either naïve Bt OMVs or Bt StOmpA-OMVs via the oral or parental (intraperitoneal; IP.) route (see Materials and Methods for immunisation protocol) were subsequently challenged with an oral dose of $10^8$ CFU *Salmonella enterica* ser. *Typhimurium* SL1344. Five days later animals were euthanised and the bacterial load in the ileum and colonic contents; homogenates of mesenteric lymph nodes (MLN); ileum tissue; spleen; and liver were determined by plating serial dilutions onto xylose lysine deoxycholate agar plates supplemented with 50 µg/ml streptomycin. The boxplots identify the mean and upper and lower quartile values for data sets obtained from animals within each treatment group.

Figure 13:
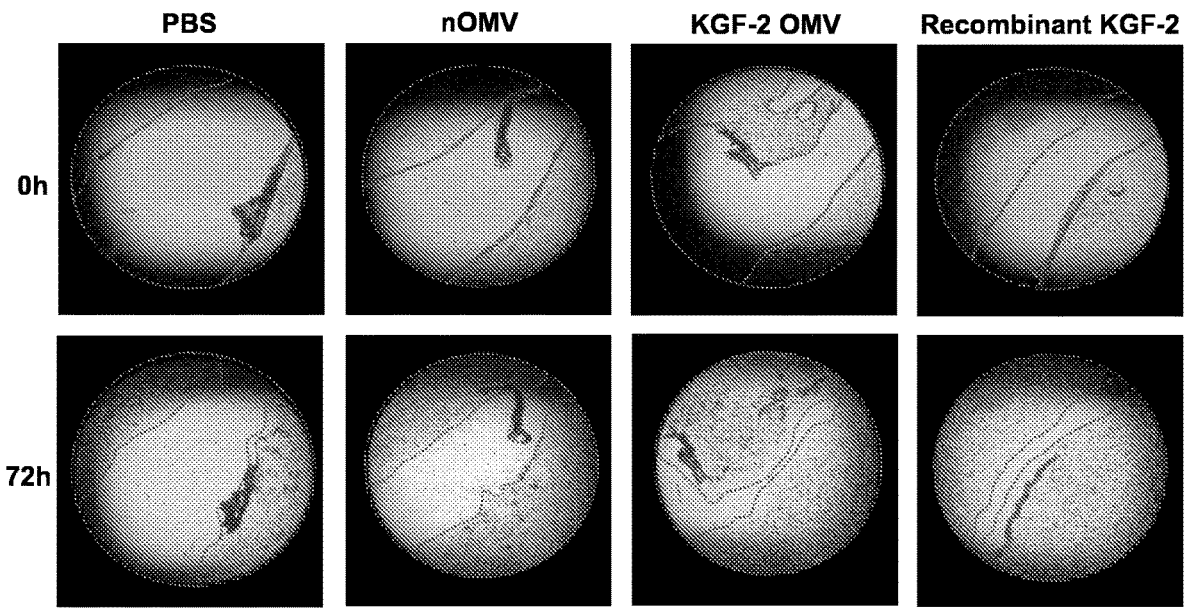
Figure 13:
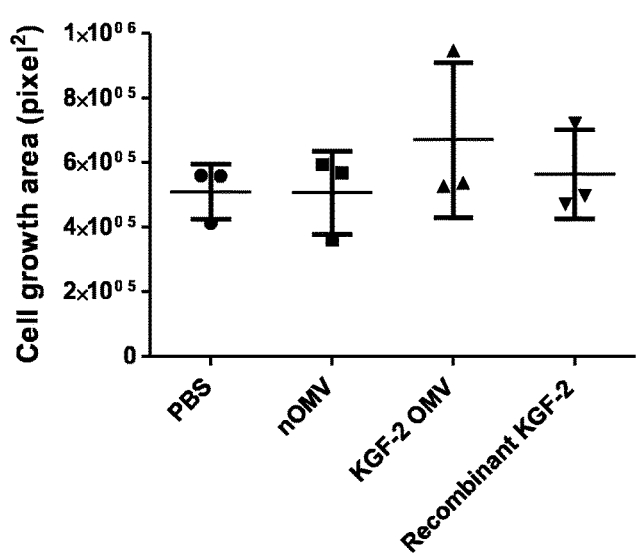

FIG. 13: Evaluating the biological activity of KGF-2 contained in Bt OMVs using an epithelial wound healing assay. (a) Representative micrographs of healing of a scratch wound in a confluent monolayer of Caco2 cells after exposure to PBS, naïve OMVs, KGF-2 OMVs or recombinant KGF-2 for 72 h. Red dotted lines demarcate the wound margin. (b) Graphical representation of cell growth across the wound area after 72 h as determined by pixel$^2$.

Figure 14:
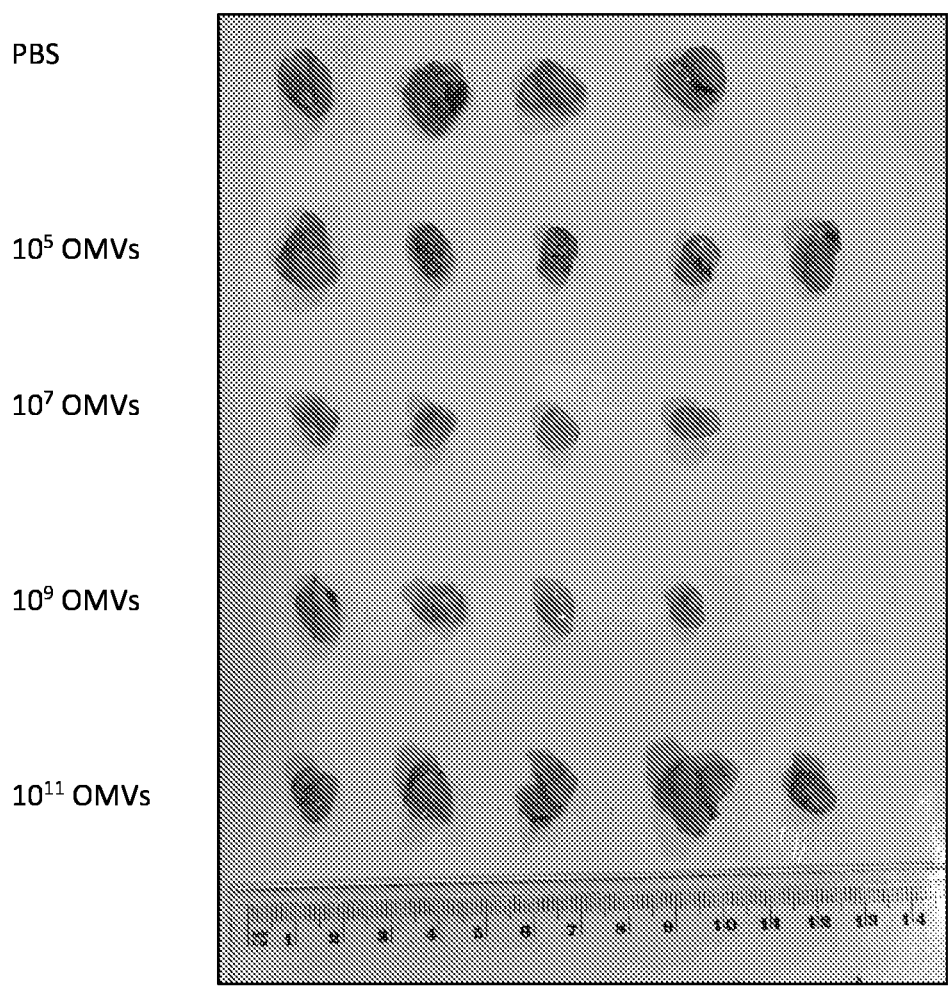

FIG. 14: Breast cancer tumours excised and imaged.

Figure 15:
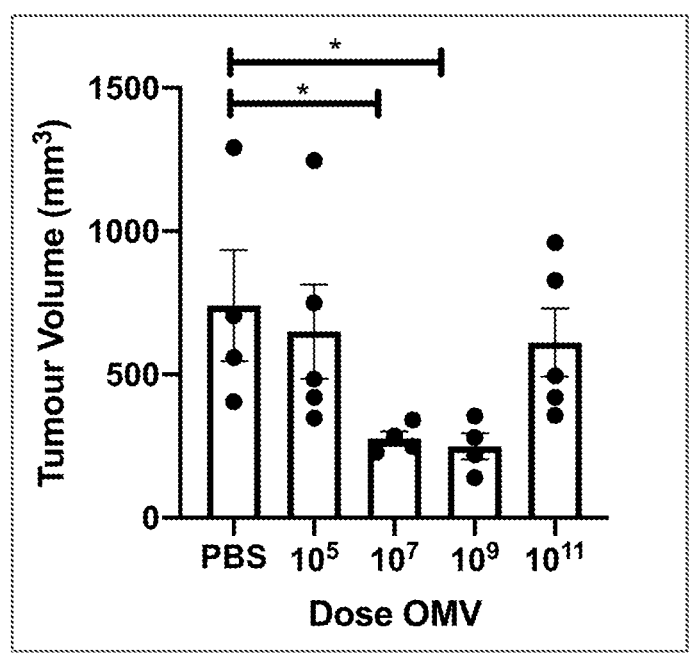

FIG. 15: Plotted OMV dose versus tumour volume from tumours shown in FIG. 14.

BT OMVS HAVE INHERENT ADJUVANTICITY

Many conventional vaccines rely on the inclusion of adjuvants to enhance their immunogenicity and to reduce the number of doses and amount of antigen (or pathogen component) required to elicit a protective immune response, particularly in immunocompromised individuals [2, 39]. To formally evaluate the adjuvant properties of Bt OMVs, mice were administered a single dose of native OMVs in PBS via the intranasal route and 5 days later head and thoracic organs were removed en bloc and analysed by immunohistology for the presence of organised lymphoid structures and follicles indicative of an active immune response. Large organised lymphoid follicles were present in both the nasal cavity (nasal-associated lymphoid tissue or NALT (FIG. 3a) and the lungs (bronchus-associated lymphoid tissue or BALT) (FIG. 3b) which contained dendritic cells, T cells and large numbers of B cells. These structures were absent in mice administered PBS alone (FIG. 3a, b). Of note, OMVs (native) were also effective at eliciting the formation of lymphoid clusters in mediastinal adipose tissue (fat-associated lymphoid clusters or FALC) (FIG. 3c).

Consistent with the immune response priming ability of Bt OMVs, within 24 h of intranasal administration of fluorescent labelled native OMVs it was possible to detect their uptake in the NALT and draining cervical lymph nodes (CLN) (Supplementary FIG. 10). At day 5, there was evidence of trafficking of OMVs to both the cervical and mesenteric lymph nodes which was almost exclusively mediated by CD11c+, CD11b+ CD103− dendritic cells (Supplementary FIG. 10).

From a biosafety perspective, neither orally nor intranasally administered native OMVs (or vaccine antigen formulated OMVs) had any adverse health effects with no tissue pathology evident in treated animals at post mortem (data not shown). Orally administered OMVs also had no or a minor and/or transient effect on intestinal microbes as determined from culturing faecal samples on selective media (Supplementary FIG. 11).

Intranasal OMV Formulation Protect Against Pulmonary IAV Infection

During infection the weight of all infected animals declined with the greatest weight loss seen in the control (PBS administered) animals that lost almost 20% of their body weight (FIG. 5f). Animals immunised with H5F-OMVs displayed a more gradual decline in weight loss after infection, as did those immunized with native OMVs.

Bt OMV-Elicit Mucosal Antibody Responses

Intranasally-administered OMVs increased global IgA levels in in both the salivary glands (FIG. 4d) and BAL (FIG. 4e), which is consistent with the adjuvant properties of Bt OMVs and their ability to activate the immune system in both of these sites and generate organised lymphoid follicles and tissues containing large numbers of B cells (FIG. 3).

Further Method

Bt and its derivative strains (Table 1) are grown under anaerobic conditions at 37° C. in 'Brain Heart Infusion' (BHI) medium (Oxoid) supplemented with 15 μM haemin (Sigma-Aldrich) (BHIH) for bacterial pre-culture or 0.75 μM haemin for OMV preparations. Antibiotic-resistance markers in Bt were selected using erythromycin (5 μg/ml) and tetracycline (1 μg/ml).

*Escherichia coli* strains were grown in Luria-Bertani (LB) medium at 37° C. with ampicillin 100 μg/ml (or 200 μg/ml trimethoprim for strain J53 [pR751]). *Lactococcus lactis* strain UKLc10 and its derivative strains were grown in M17 medium (Oxoid) supplemented with 5 g/l glucose at 30° C. Antibiotics were added as selection agents when appropriate: ampicillin 200 μg/ml, erythromycin 5 μg/ml and chloramphenicol 10 μg/ml. The *E. coli* strain J53/R751 was supplemented with trimethoprim 200 μg/ml when grown for 18 h. The *E. coli* strain GC10 and the *L. lactis* strain UKLc10 were transformed by electroporation using a Gene Pulser II (Bio-Rad). For constructs relating to pUK200, the host *L. lactis* strain UKLc10 was used.

Construction of other plasmids described below was achieved using *E. coli* strain GC10 as the host. Plasmids were mobilized from the *E. coli* into the Bt following a triparental filter mating protocol [19] using the helper strain J53/R751. All primers used are detailed in Table 2 (SEQ ID NOs: 1-12, from top to bottom).

TABLE 2

Primer sequences used in this stdy

| Primer | Sequence (5'→3')* |
|---|---|
| f-5'ompA_SphI | ATCTGCATGCTTTCGAGGAAGAACCGATGGTTGC |
| r-5'ompA_SalI | ATACGTCGACAATATAGCGGACTGCAATCC |
| f-3'ompA-BamHI | ACTTGGATCCTTCTGAATCGTGTGGTATTGG |
| r-3'ompA_SacI | ACTAGAGCTCATCTGTAGAGAAGAAACGGG |
| SPBTOmpA-fwd | CATGTTGCTGGCTTTTGCCGGCGTTGCGTCTGT CGCTTCTGCGCAGCAACCGTGACTGTAACTGAA TACGAGGTTATTCATATGTGACG |
| SPBTOmpA-rev | AATTCGTCACATATGAATAACCTCGTATTCAGT TACAGTCACGGTTTGCTGCGCAGAAGCCGACAG ACGCAACGCCGGCAAAAGCCAGCAA |
| OmpAST-fwd | TGACCATATGGCTCCGAAAGATAACACC |
| OmpAST_rev | GTCAGAATTCTTAAGCCTGCGGCTGAGTTA |
| SseB_fwd | TGACCATATGTCTTCAGGAAACATCTT |
| SseB_rev | TGACGAATTCATGAGTACGACGTTTTCTGCG |
| XhoI_STOmpA_rev | ATATCTCGAGGAAACTTAAGCCTGCGG |
| XhoI_SseB_rev | ATATCTCGAGATGAGTACGTTTTCTGCG |

Construction of a BT 3852 Deletion Mutant

A 1018 bp chromosomal DNA fragment upstream from BT_3852 and including the first 18 nucleotides of its 5'-end region was amplified by PCR using the primer pair f-5'ompA_SpHI, r-5'ompA_SalI. This product was then cloned into the SpHI/SalI sites of the *E. coli-Bacteroides* suicide shuttle vector pGH014 [20]. A 761 bp chromosomal DNA fragment downstream from BT_3852, including the last 46 nucleotides of the 3'-end region, was amplified by PCR using the primer 10 pair f-3'ompA_BamHI, r-3'ompA_SacI and was cloned into the BamHI/SacI sites of the pGH014-based plasmid. The resulting plasmid containing the ΔBT_3852: tetQ construct, was mobilized from *E. coli* strain GC10 into Bt by triparental filter mating [19], using *E. coli* HB101 (pRK2013) as the helper strain. Transconjugants were selected on BHI-haemin agar containing gentamicin (200 mg/L) and tetracycline (1 mg/L). Determination of susceptibility to either tetracycline or erythromycin was done to identify recombinants that were tetracycline resistant and erythromycin susceptible after re-streaking transconjugant bacteria on LB-agar containing tetracycline or both antibiotics. PCR analysis and sequencing were used to confirm allelic exchange. A transconjugant, GH290, containing the ΔBT_3852:tetQ construct inserted into the Bt chromosome was selected for further studies.

Generation of Recombinant Bt Strains

Bt Salmonella OmpA/SseB: The *Bacteroides* expression vector pGH090 [21] was first digested with NdeI to remove this site by Klenow treatment and to create a blunt-ended fragment that was then religated. A sequence containing 90 bp of the BT_3852 gene 5' end (encoding a major outer membrane protein, OmpA) corresponding to the signal peptide sequence (SpOmpA) of the protein obtained from the microbial genome database (mbgd.genome.ad.jp) was used to design the complementary oligonucleotide pair SPBTOmpA_fwd and SPBTOmpA_rev. Signal peptide prediction was obtained by SignalP (www.cbs.dtu.dk). After annealing of the oligonucleotides the resulting double-strand DNA contained EcoRI and SphI 5' overhangs at each end. This linker was cloned into the EcoRI/SphI sites of the NdeI deleted version of pGH090, resulting in the pGH202 plasmid. The 1131 bp Salmonella ompA (without signal peptide) and the 591 bp sseB coding region were amplified by PCR from *S. Typhimurium* serovar enterica SL 1334 genomic DNA using the primer pairs OmpAST_fwd with OmpAST_rev, and SseB_fwd with SseB_rev, respectively. The resulting fragments were digested with NdeI and EcoRI and cloned into NdeI/EcoRI-digested pGH202, yielding plasmids pGH182 and pGH183, respectively. The latter plasmid was then transformed into *E. coli*-competent cells (GC10) by electroporation using a Gene Pulser II (Bio-Rad). Successful cloning was confirmed by sequencing. The plasmid was mobilized from *E. coli* to Bt using a triparental mating procedure [19], together with *E. coli* J53 (pR751); the correct structure of the Bt carrying pGH182 (GH484) was confirmed by sequencing.

Bt IAV: A 635 bp synthetic gene construct encoding a synthetic influenza (H5F; from IAV strain H5N1 [VN/04: A/VietNam/1203/04]) pre-fusion headless HA mini-stem N-terminally fused to the OmpA signal peptide of Bt was created in silico and its codon usage was optimised for expression in the same species. The resulting gene cassette was obtained by gene synthesis and subsequently cloned into the *E. coli* plasmid pEX-K168 (Eurofins). The cassette contained BspHI and EcoRI restriction sites at its 5' and 3' ends, respectively, allowing for the translational fusion of the gene to the start codon in the *Bacteroides* expression vector pGH090 [21]. The gene was excised from pEX-K168 using BspHI and EcoRI and ligated into the NcoI/EcoRI-restricted pGH090 expression vector, resulting in pGH184. Finally the sequence integrity of the cloned fragment was confirmed by sequencing. The plasmid was mobilized from *E. coli* into Bt through a triparental mating procedure.

Bt KGF-2: A 581 bp synthetic gene construct encoding the human fibroblast growth factor-10/keratinocyte growth factor-2 (KGF-2) N-terminally fused to the OmpA signal peptide of Bt was created in silico and its codon usage was optimised for expression in the same species. The resulting gene cassette was obtained by gene synthesis and subsequently cloned into the *E. coli* plasmid pEX-A2 (Eurofins) as described for the IAV constructs. The cassette contained BspHI and EcoRI restriction sites at its 5' and 3' ends, respectively, allowing for the translational fusion of the gene to the start codon in the *Bacteroides* expression vector pGH0902. The gene was excised from pEX-A2 using Eco53KI and EcoRI and ligated into pUK200 [22], which had been restricted with SmaI and EcoRI, resulting in plasmid pUK200_KGF-2. Next the KGF-2 cassette was excised from pUK200_KGF-2 through restriction with BspHI and EcoRI and subsequently ligated into the NcoI/EcoRI-restricted pGH090 expression vector, resulting in pGH173. Finally the sequence integrity of the cloned fragment was confirmed by sequencing. The plasmid was mobilized from *E. coli* into Bt using a triparental mating procedure.

Expression and Purification of Recombinant StOmpA and StSseB

StOmpA was cloned into His6-tag expression vector pET-15b (Novagen). Briefly, PCR fragments incorporating the coding sequences of ompA and sseB genes were cloned into the NdeI/XhoI restriction sites of pET-15b and the resulting plasmids pGH165 and pGH201 transformed into Rosetta2 (DE3) pLysS cells (Table 1). Cultures of the resulting strains were induced at an of OD600 nm of 0.6 by adding 1 mM IPTG for 5 h after which time cells were harvested by centrifugation (5500 g for 20 min). The pellet was stored at −20° C. for future use. StOmpA and StSseB proteins were purified under native conditions using protocols adapted from the QIAexpress Ni-NTA Fast Start Handbook (Qiagen) with the amount of protein recovered determined using the Bio-Rad Protein Assay.

OMV Isolation and Characterisation

OMVs were isolated following a method adapted from Stentz et al., [20]. Briefly, cultures of Bt (500 mL) were centrifuged at 5500 g for 45 min at 4° C. and the supernatants filtered through polyethersulfone (PES) membranes (0.22 µm pore-size) (Sartorius) to remove debris and cells. Supernatants were concentrated by ultrafiltration (100 kDa molecular weight cut-off, Vivaspin 50R, Sartorius), the retentate was rinsed once with 500 mL of PBS (pH 7.4) and concentrated to 1 mL (approx. 700 µg/ml total protein). The final OMV suspensions were filter sterilized (0.22 µm pore size). The protein content of the final OMV suspensions was determined using the Bio-Rad Protein Assay.

The distribution of heterologous proteins within Bt OMVs was established in a Proteinase K accessibility/protection assay [20]. Briefly, a suspension of 250 µg of OMVs in 0.1 M phosphate/1 mM EDTA buffer (pH 7.0) was incubated for 1 h at 37° C. in the presence of 100 mg/L proteinase K (Sigma-Aldrich). Proteinase K activity was stopped by addition of 1 mM phenylmethanesulfonyl fluoride (PMSF) and samples analysed by immunoblotting. The Sseb content of Bt OMVs was determined by targeted proteomics done by the Proteomics Facility, University Bristol, UK.

Electron Microscopy

Suspensions of OMVs were fixed for 1 h using 25% glutaraldehyde then centrifuged at 13,000 g for 10 min. The OMV pellets were mixed 1:1 with molten 2% low gelling temperature agarose (TypeVII, Sigma), which was solidified by chilling and then cut into ~1 mm3 cubes. The sample pieces were then further fixed in 2.5% glutaraldehyde in 0.1M PIPES buffer for 16 h at 4° C. after which time they were washed three times in 0.1M PIPES buffer and dehydrated through a series of ethanol solutions (30, 50, 70, 80, 90%, and 3 times in 100%) after which the ethanol was replaced with a 1:1 mix of 100% ethanol:LR White medium grade resin and put on a rotator for 1 h. This was followed by a 1:2 and then a 1:3 mix of 100% ethanol:LR White resin mix and finally 100% resin, with at least 1 h between each change. The resin was changed twice more with fresh 100% resin with 8 h between changes. The sample pieces were each transferred into BEEM embedding capsules with fresh resin and polymerised for 16 h at 60° C. Sections of ~90 nm thick were cut using an ultramicrotome (Ultracut E, Reichert-Jung) with a glass knife and collected on film/carbon coated gold grids. A modified version of the Aurion Immunogold labelling (IGL) protocol (www.aurion.nl) was used with 1 h antibody incubations and detergent (0.1% TWEEN). The primary anti-Bt OmpA antisera was obtained by immunising rabbits with the peptide GGPREDGSYKQRWDYMN (SEQ ID NO: 13) (Cambrige Research Biochemical), and was used at a dilution of 1/500. The secondary anti-rabbit Ig (GAR-10, Agar Scientific) was used at a dilution of 1/50. After antibody labelling, sections were stained with 2% uranyl acetate for 40 min and imaged in a FEI Tecnai G2 20 Twin transmission electron microscope at 200 kV.

Immunoblotting

Bt cell and OMV extracts were obtained by sonication and the supernatants added to SDS Page loading buffer (NuPage) containing dithiothreitol (Invitrogen). Approximately 7 µg of the total protein was loaded onto 12% precast Tris-Glycine gels (Novex) and separated by electrophoresis at 180 volts for 40 min. The gel was then transferred onto a polyvinylidene difluoride (PVDF) membrane at 25 volts for 2 h in a solution containing Tris-Glycine Transfer Buffer (Novex). The membrane was blocked with 10% BSA in TBS-Tween (TBS [50 mM Tris-HCl; 150 mM NaCl; pH 7.5] with 0.05% Tween) by shaking for 30 min at 20° C. The blocking solution was then discarded and the membrane incubated for 16-18 h at 4° C. in TBS-Tween with 5% BSA containing primary antibody (anti-Salmonella OmpA [Antibody Research Corporation], -KGF-2 [Peprotech] or -IAV or Anti-polyHisitdine Clone HIS-1 (Sigma-Aldrich). After washing with a wash buffer (TBS-Tween, Sigma Aldrich), membranes were incubated in 5% BSA in TBS-Tween containing HRP-conjugated goat anti rabbit IgG (1:1000 dilution, ThermoFisher) for 1 oh at 20 C. After 3 washes with TBS-Tween, SuperSignal West Pico chemiluminescent Substrate (ThermoFisher) was used to detect bound antibody.

Mammalian Cell Culture

The human colonic epithelial cell line Caco-2 (ECACC 86010202) was cultured at 37° C. and 5% $CO_2$ in Dulbecco's Modified Eagle Medium (DMEM) with 4.5 g/L glucose and L-glutamine (Lonza, Switzerland) supplemented with 5% foetal bovine serum (FBS, Lonza).

Epithelial Cell Scratch Assay

Caco-2 cells were grown in T25 flasks until they reached 90% confluency. Cells were digested using trypsin EDTA (200 mg/L, 170,000 U Trypsin/L, Lonza) and seeded onto 8-well µ-slides (Ibidi). Cells were grown until they formed a 90% confluent monolayer and then serum-starved for 8 h. A scratch was made on the monolayer using a sterile tip and cells were washed with PBS to remove cell debris. The remaining cells were incubated for 72 h in 1% FBS medium supplemented with heparin (300 µg/mL grade I-A, >180 USP units/ml; Sigma-Aldrich) in the presence of PBS, native OMVs, KGF-2 OMVs or recombinant KGF-2 (500 ng/ml, PeproTech). Wound healing was monitored by taking images immediately after scratching (time 0 control) and every 24 hours using an Invertoskop ID03 inverted microscope (Carl Zeiss) and a Sony Xperia Z5 compact digital camera (Sony). The measurements of the recovered scratch area (pixel2) at each time point were analysed using ImageJ software. The experiment was performed in triplicate.

Animal Experiments

All animal experiments were done using 6 to 8 week old C57BL/6 male mice that were bred and maintained in animal facilities either at the University of East Anglia (UK) or the University of Liverpool. Mice were housed in individually ventilated cages and exposed to a 12 h light/dark cycle with free access to a standard laboratory chow diet. Animal experiments were conducted in full accordance with the Animal Scientific Procedures Act 1986 under UK Home Office (HMO) approval and HMO project license 70/8232 (UEA) and 70/8599 (UoL).

OMV vaccines and vaccination: To evaluate oral Salmonella OMV vaccine formulations, groups of mice (n=5-6/group) were gavaged with either 100 µl of StOmpA-OMVs or native OMVs in PBS. Prior to each immunization food was removed for approximately 4 h to decrease stomach acidity. Booster oral immunisations were given 1 and 2 months later. An additional control group of animals were immunised with StOmpA-OMVs via the intraperitoneal route. To assess intranasal immunisation with Salmonella and influenza virus OMV vaccine formulations, groups of mice (n=5-10/group mice were anaesthetized then intranasally dosed with either StOmpA OMVs, StSseB OMVs, H5F OMVs, native OMVs (~0.5 ug) or PBS and 7 and 14 days later received booster immunizations. For infectious challenge with Salmonella, StOmpA-OMV orally or ip immunised mice were orally administered 108 CFU of S. typhimurium SL1344 on day 28 and 5 days later the bacterial load in different tissues was determined. For infectious challenge with IAV, H5F-OMV immunised mice were anaesthetised on day 28 with ketamine via the intra-muscular route and inoculated intranasally with 103 PFU A/PR/8/34 (PR8) H1N1 strain of IAV in 50 µl sterile PBS, which is equivalent to a 10-fold lethal dose. Weights of each animal were recorded from the day of challenge up until the end point at day 33 when the mice were euthanised. At necropsy, blood/serum and bronchoalveolar lavage fluid were taken for antibody and cytokine analyses and lung tissue was used to determine virus titre. For in vivo OMV trafficking studies, mice were intranasally administered with DiO-labelled H5F-OMVs and 1 and 5 days later OMV acquisition and uptake was determined using flow cytometry in: the macrophage and dendritic cells of the BAL; nasal associated lymphoid tissue (NALT); and cervical and mediastinal lymph nodes.

IAV quantification: Plaque assays were performed on homogenates of lung tissue from PR8-infected mice as described previously [23]. Briefly, viral samples from lungs were titrated in a 10-fold serial dilution from 1016 to 10 in DMEM supplemented with TPCK-trypsin.

Each dilution was incubated with MDCK cells in individual wells of a 24 well plate for 1 hour at 37° C., 5% $CO_2$. The media was aspirated and replaced with overlay media containing 2.4% Avicel. Plates were incubated at 37° C., 5% $CO_2$ for 72 hours. Avicel was aspirated, plates were washed and cells were fixed in acetone:methanol (60:40) for 10 min. Cells were allowed to air dry prior to staining with crystal violet for 10 minutes, washed and air dried. Plaques were counted and then multiplied by the dilution factor and the volume of virus plated to give viral titre (PFU/ml).

Acute colitis: The dextran sulphate sodium (DSS) induced mouse model of acute colitis was used to test the therapeutic potential of KGF-containing OMVs. Mice were divided into six groups (n=5/grp) and administered with either PBS, native OMVs, KGF-OMVs, DSS+PBS, DSS+native OMVs or, DSS+KGF-OMVs for 7 days. Experimental colitis was induced in the appropriate treatment groups of mice by administration of 2.5% w/v DSS (36,000-50,000 Da, MP Biomedicals, USA) in drinking water ad libitum for 7 days. The other groups of mice received fresh water alone throughout the duration of the experiment. PBS and OMVs were administered by oral gavage (100 µL) on days 1, 3 and 5 and on day 7 mice were euthanized. Fresh faecal pellets were collected daily by placing individual mice in an empty cage without bedding material for 5-15 min. The extent of colitis was evaluated using a disease activity index (Table S1) comprising daily body weights, stool consistency and rectal bleeding assessments. At autopsy the colon was aseptically extracted and photographed, and the contents collected in sterile vials and stored at −80° C. The colon length was measured, and representative samples (0.5 cm length) were taken from the distal region for histology. Histological samples were fixed in 10% neutral buffered formalin and embedding in paraffin. Tissue sections (5 µm) were prepared from each block, stained with hematoxylin (Mayer's hemalum, Merk, Germany) and eosin (Y-solution 0.5% aqueous, Merck, Germany) (H&E), and with Alcian blue (Sigma-Aldrich, USA) and Nuclear Red (Sigma-Aldrich, USA) to visualise goblet cells. Sections were observed under a DMI 3000B microscope at 40× magnification (Leica, Germany) and assessed in a blinded fashion. The histological changes were scored (Table S2) and goblet cells were enumerated using ImageJ software (USA).

Treatment of DSS-induced colitis with Bt OMVs. The dextran sulphate sodium (DSS) induced mouse model of acute colitis was used to test the therapeutic potential of OMVs. Groups of male C57BL/6 mice of 8-11 weeks of age were divided into 4 groups (n=5-10/grp), 2 of them were administered 2.25% w/v DSS (36,000-50,000 MW, MP Biomedicals, USA) in drinking water for 5 days. The control groups of mice received fresh water alone throughout for the duration of the experiment. PBS and OMVs were administered by oral gavage (100 µL) on days 5, 7 and 9 and on day 11 mice were euthanized. The extent of colitis was evaluated using a disease activity index comprising daily body weights, colon and caecum appearance, stool consistency and rectal bleeding assessments.

Antibody ELISA: ELISA plates were coated with target antigens (UV inactivated IAV [PR8] virus or H5 (H5N1) (A/Vietnam/1203/2004) Recombinant Protein (P5060, 2B Scientific Ltd), Salmonella OmpA or SseB proteins) in 0.1M NaHCO3 and incubated for 12-16 hours at 4° C. Plates were washed three times with PBS that had been supplemented with 0.05% Tween 20 (PT), and then incubated with blocking solution (PBS with 2% BSA) for 3 h at 20° C., and then washed six times with PT. Fecal pellets were homogenized in phosphate-buffered saline (pH, 7.2) with soybean trypsin inhibitor (0.5 mg/mL; Sigma), phenylmethylsulfonyl fluoride (0.25 mg/mL; Sigma), 0.05 M EDTA, and 0.05% Tween 20 (Sigma). The fecal homogenates and bronchoalveolar lavage (BAL) and serum samples were diluted in PBS with 1% BSA, 0.05% Tween (PBT) and added to the plate wells and incubated for 12-16 h at 4° C. Immune serum and BAL from PR8 IAV-infected mice were used as reference samples for analysing anti-IAV antibody responses in H5F-OMV-immunised animals. Plates were then washed six times with PT and incubated with PBT containing either HRP-anti-mouse IgG (1:1000, Thermo-Fisher) or HRP-anti-mouse IgA (1:1000, Life Technologies) for 20 min at 20° C. Plates were again washed six times with PT then incubated in darkness with TMB High Sensitivity substrate solution (BioLegend) for 30 min at 20° C. The reaction was stopped by the addition of 2 N H2SO4 and the optical density was measured at 450 nm using a TECAN infinite f50 spectrophotometer (Mannedorf, Switzerland). Abcam's IgA Mouse ELISA Kit was used to determine total IgA in salivary glands and BAL Flow cytometry: Approximately 1×106 tissue-derived cells were incubated in PBS supplemented with 2% FCS (PBS-FCS) for 15 min at 4° C. prior to the addition of fluorochrome-conjugated monoclonal antibodies specific for CD11b (clone M1/70, eBioscience) CD11c (clone N418, eBioscience), or CD103 (clone 2E7, eBioscience) in PBS-FCS and incubated for 30 min at 4° C. in darkness. Cells were then washed in PBS-FCS and fixed in PBS supplemented with 4% paraformaldehyde for 15 min at 20° C. prior to analysis on a MACSQuant Analyzer 10 (Miltenyi Biotech). Data were analysed using FlowJo.

Immunohistology

From all mice, the entire, skinned heads were fixed in 10% buffered formalin for 48 h. Subsequently, approximately 2 mm slices were prepared by sagittal sections, using a diamond saw (Exakt Band System 300 CL; EXAKT Technologies Inc.), yielding a total of six sections from the tip of the nose to the foramen occipitale magnum. Sections were gently decalcified for 7 days in RDF Mild Decalcifier (CellPath Ltd) at room temperature. Likewise, thoracic organs (lungs, lymph nodes, heart and thymus) were removed en bloc, fixed for 24 h in 10% buffered formalin and trimmed. Head and organ specimens were then routinely paraffin wax embedded. Consecutive sections (3-5 µm) were prepared and were stained with haematoxylin eosin for histological examination, or subjected to immunohistological staining. Immunohistology (IH) was performed using the horseradish peroxidase method as previously described [24, 25]. Primary antibodies used were rat anti-mouse CD45R (clone B220, BD Biosciences; B cells), rabbit anti-CD3 (clone SP7; Bioscience; T cells) and rabbit anti-Iba-1 (Wako; macrophages and dendritic cells).

Statistical Analysis

Data were subjected to the D'Agostino & Pearson omnibus normality test. One-way ANOVA followed by a Tukey's multiple comparison post hoc tests were made using Graph-Pad Prism 5 software (USA). Statistically significant differences between two mean values were established by a p-value<0.05. Data are presented as the mean±standard deviation.

Breast Cancer OMV

The Study Design Involved:
Tumour cells injected subcutaneously into adult mice on day 0
Bt OMVs injected intraperitoneally on days 7, 10, 12
Tumours harvested on day 14

Assays:
Tumour volumes measurement.
Whole body imaging of animals that received fluorescently labelled OMVs.
Tumours were snap frozen for histology, cytokine analysis, transcript analysis.

Results:
Tumours excised and imaged (FIG. 14)
Plotted OMV dose versus tumour volume (FIG. 15).
The tumours from the labelled animals were intensely fluorescent consistent with OMVs localising and accessing the tumour.

Conclusions:
Native Bt OMVs possess anti-tumour properties, being able to significantly reduce the size of established breast cancer tumours.
The OMV anti-tumour effect is dependent on dose. The optimal dose range is between $10^7$ and $10^9$. Below and above this range, OMVs are ineffective. This is consistent with findings from in vitro experiments using primary immune cells and assessing the nature of their response to OMVs.

The invention claimed is:

1. A pharmaceutical preparation comprising outer membrane vesicles (OMVs), at least one additional pharmaceutically active component comprising a vaccine agent, and at least one pharmaceutically acceptable carrier, wherein said OMVs are native OMVs produced by the Gram-negative commensal bacteria *Bacteroides*, and wherein the OMVs are an adjuvant to reduce the number of doses and/or amount of vaccine agent required to elicit a protective immune response.

2. A pharmaceutical preparation according to claim 1 wherein the pharmaceutically acceptable carrier is buffered saline.

3. A pharmaceutical preparation according to claim 1 wherein the preparation is to prevent infection, tumour growth, tissue inflammation and/or injury to the gastrointestinal (GI) and/or respiratory tract and other organ systems.

4. A pharmaceutical preparation according to claim 1 wherein the pharmaceutical preparation comprises at least two additional pharmaceutically active components.

5. A pharmaceutical preparation according to any preceding claim wherein the species of *Bacteroides* producing the OMVs is *B. acidifaciens, B. caccae, B. coprocola, B. coprosuis, B. eggerthii, B. finegoldii, B. fragilis, B. helcogenes, B. intestinalis, B. massiliensis, B. nordii, B. ovatus, B. stercoris, B. thetaiotaomicron, B. vulgatus, B. plebeius, B. uniformis, B. salyersai, B. pyogenes, B. goldsteinii, B. dorei and B. johnsonii* and/or *B. xylanisolvens*.

6. A pharmaceutical preparation according to claim 5 wherein the *B. thetaiotaomicron* (Bt) comprises Bt strains VPI-5482, GH193, GH359 and/or GH364.

7. A pharmaceutical preparation according to claim 1 wherein the at least one additional pharmaceutically active component comprises a *Salmonella typhimurium*-derived vaccine antigens.

8. A pharmaceutical preparation according to claim 1 wherein the at least one additional pharmaceutically active component comprises an influenza A virus (IAV) derived vaccine antigens.

9. A pharmaceutical preparation according to claim 1 wherein the OMV comprises a core stalk region of an influenza A virus (IAV) H5 hemagglutinin from an H5N1 strain.

10. A pharmaceutical preparation according to claim 1 wherein said pharmaceutical preparation further comprises a heterologous peptide, protein or biologic.

11. A pharmaceutical preparation according to claim 1 wherein the pharmaceutical preparation is for use in a method for the treatment of typhoid.

12. A pharmaceutical preparation according to claim 1 wherein the pharmaceutical preparation is for use in a method for the treatment of colitis.

13. A pharmaceutical preparation according to claim 1 wherein the pharmaceutical preparation is formulated for intranasal administration.

* * * * *

SEQUENCE LISTING

<160> NUMBER OF SEQ ID NOS: 13

<210> SEQ ID NO 1

```
<211> LENGTH: 34
<212> TYPE: DNA
<213> ORGANISM: Artificial Sequence
<220> FEATURE:
<223> OTHER INFORMATION: synthetic construct

<400> SEQUENCE: 1
atctgcatgc tttcgaggaa gaaccgatgg ttgc                                 34

<210> SEQ ID NO 2
<211> LENGTH: 30
<212> TYPE: DNA
<213> ORGANISM: Artificial Sequence
<220> FEATURE:
<223> OTHER INFORMATION: synthetic construct

<400> SEQUENCE: 2
atacgtcgac aatatagcgg actgcaatcc                                      30

<210> SEQ ID NO 3
<211> LENGTH: 31
<212> TYPE: DNA
<213> ORGANISM: Artificial Sequence
<220> FEATURE:
<223> OTHER INFORMATION: synthetic construct

<400> SEQUENCE: 3
acttggatcc ttctgaatcg tgtggtattg g                                    31

<210> SEQ ID NO 4
<211> LENGTH: 30
<212> TYPE: DNA
<213> ORGANISM: Artificial Sequence
<220> FEATURE:
<223> OTHER INFORMATION: synthetic construct

<400> SEQUENCE: 4
actagagctc atctgtagag aagaaacggg                                      30

<210> SEQ ID NO 5
<211> LENGTH: 90
<212> TYPE: DNA
<213> ORGANISM: Artificial Sequence
<220> FEATURE:
<223> OTHER INFORMATION: synthetic construct

<400> SEQUENCE: 5
catgttgctg gcttttgccg gcgttgcgtc tgtcgcttct gcgcagcaaa ccgtgactgt     60
aactgaatac gaggttattc atatgtgacg                                      90

<210> SEQ ID NO 6
<211> LENGTH: 90
<212> TYPE: DNA
<213> ORGANISM: Artificial Sequence
<220> FEATURE:
<223> OTHER INFORMATION: synthetic construct

<400> SEQUENCE: 6
aattcgtcac atatgaataa cctcgtattc agttacagtc acggtttgct gcgcagaagc     60
gacagacgca acgccggcaa aagccagcaa                                      90

<210> SEQ ID NO 7
<211> LENGTH: 28
<212> TYPE: DNA
<213> ORGANISM: Artificial Sequence
```

-continued

```
<220> FEATURE:
<223> OTHER INFORMATION: synthetic construct

<400> SEQUENCE: 7
tgaccatatg gctccgaaag ataacacc                                          28

<210> SEQ ID NO 8
<211> LENGTH: 30
<212> TYPE: DNA
<213> ORGANISM: Artificial Sequence
<220> FEATURE:
<223> OTHER INFORMATION: synthetic construct

<400> SEQUENCE: 8
gtcagaattc ttaagcctgc ggctgagtta                                        30

<210> SEQ ID NO 9
<211> LENGTH: 27
<212> TYPE: DNA
<213> ORGANISM: Artificial Sequence
<220> FEATURE:
<223> OTHER INFORMATION: synthetic construct

<400> SEQUENCE: 9
tgaccatatg tcttcaggaa acatctt                                           27

<210> SEQ ID NO 10
<211> LENGTH: 28
<212> TYPE: DNA
<213> ORGANISM: Artificial Sequence
<220> FEATURE:
<223> OTHER INFORMATION: synthetic construct

<400> SEQUENCE: 10
tgacgaattc atgagtacgt tttctgcg                                          28

<210> SEQ ID NO 11
<211> LENGTH: 27
<212> TYPE: DNA
<213> ORGANISM: Artificial Sequence
<220> FEATURE:
<223> OTHER INFORMATION: synthetic construct

<400> SEQUENCE: 11
atatctcgag gaaacttaag cctgcgg                                           27

<210> SEQ ID NO 12
<211> LENGTH: 28
<212> TYPE: DNA
<213> ORGANISM: Artificial Sequence
<220> FEATURE:
<223> OTHER INFORMATION: synthetic construct

<400> SEQUENCE: 12
atatctcgag atgagtacgt tttctgcg                                          28

<210> SEQ ID NO 13
<211> LENGTH: 17
<212> TYPE: PRT
<213> ORGANISM: Artificial Sequence
<220> FEATURE:
<223> OTHER INFORMATION: synthetic construct
```

```
<400> SEQUENCE: 13

Gly Gly Pro Arg Glu Asp Gly Ser Tyr Lys Gln Arg Trp Asp Tyr Met
1               5                   10                  15
Asn
```